(12) United States Patent
Hess et al.

(10) Patent No.: US 6,719,467 B2
(45) Date of Patent: Apr. 13, 2004

(54) FLOOR PRINTER

(75) Inventors: Jeffery S Hess, Corvallis, OR (US); Rob Patrick Chohan, Lebanon, OR (US); Wiatt Kettle, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/846,152

(22) Filed: Apr. 30, 2001

(65) Prior Publication Data

US 2002/0158955 A1 Oct. 31, 2002

(51) Int. Cl.$^7$ ................................................ B41J 11/44
(52) U.S. Cl. ............................ 400/76; 400/61; 400/70; 400/88
(58) Field of Search ........................... 400/76, 70, 61, 400/88

(56) References Cited

U.S. PATENT DOCUMENTS

| | | | |
|---|---|---|---|
| 4,211,012 A | 7/1980 | Alles et al. ................. 33/18 R |
| 5,240,334 A | 8/1993 | Epstein et al. ................. 400/88 |
| 5,443,630 A | 8/1995 | von der Eltz et al. ... 106/31.27 |
| 5,578,813 A | 11/1996 | Allen et al. ............... 250/208.1 |
| 5,644,139 A | 7/1997 | Allen et al. .................. 250/557 |
| 5,778,347 A | 7/1998 | Hetzer ......................... 705/408 |
| 5,842,793 A | 12/1998 | Katayama et al. ............. 400/88 |
| 5,848,849 A | 12/1998 | Kishi et al. .................... 400/88 |
| 5,853,251 A | 12/1998 | Imai ............................. 400/88 |
| 5,870,112 A | * 2/1999 | Kang et al. ..................... 347/9 |
| 5,880,448 A | 3/1999 | Hetzer et al. ................ 235/383 |
| 5,887,992 A | 3/1999 | Yamanashi .................... 400/88 |
| 5,927,872 A | * 7/1999 | Yamada ........................ 400/88 |
| 5,988,900 A | 11/1999 | Bobry .......................... 400/88 |
| 5,994,710 A | 11/1999 | Knee et al. .................. 250/557 |
| 6,139,139 A | 10/2000 | Stoffel et al. .................. 347/96 |
| 6,347,897 B2 | * 2/2002 | Huggins et al. ............. 101/288 |
| 6,357,939 B1 | * 3/2002 | Baron .......................... 400/61 |

* cited by examiner

Primary Examiner—Charles H. Nolan, Jr.

(57) ABSTRACT

A floor printer has a printing device and a fiducial nozzle along a bottom of a housing. The fiducial nozzle deposits a marks on a medium. The printing device forms an image on the medium.

24 Claims, 14 Drawing Sheets

FLOOR PRINTER

FIELD OF THE INVENTION

The present invention relates to printers, more particularly to a floor printer and methods of printing using the floor printer.

BACKGROUND OF THE INVENTION

Promotional and seasonal items are often displayed to the public in prominent places in order to get attention. Public areas where such items are displayed generally include malls, and retail stores. Generally, the eye level locations, which are the most prominent places, are filled with shelves, windows, and other promotional items. Space is usually at a premium in these retail stores, and it is not uncommon to find displayed items blocking aisles. Therefore, it is desired to maximize the space available in public areas to successfully advertise to potential customers.

SUMMARY OF THE INVENTION

In one embodiment, a floor printer has a printing device and a fiducial nozzle along a bottom of a housing. The fiducial nozzle deposits a mark on a medium. The printing device forms an image on the medium.

Many of the attendant features of this invention will be more readily appreciated as the same becomes better understood by reference to the following detailed description and considered in connection with the accompanying drawings in which like reference symbols designate like parts throughout.

BRIEF DESCRIPTION OF THE DRAWINGS

FIG. 3b is a schematic cross-sectional view of the floor printer through section 3b—3b of FIG. 3a;

FIG. 3c is a front view of the floor printer in a direction viewed from section 3c—3c of FIG. 3a;

FIG. 3d is a schematic bottom view of the print path of the floor printer of FIG. 3a;

FIG. 4b is a side view of the floor printer of FIG. 4a;

FIG. 6b is a schematic bottom view of the print path of the floor printer of FIG. 6a;

FIG. 7b is a top view of a fiducial line on the medium from the printer of FIG. 7a;

FIG. 7c is a top view of another fiducial line on the medium from the printer of FIG. 7a;

FIG. 7d is a front view of the floor printer in FIG. 7a;

FIG. 8b is a side view of the floor printer of FIG. 8a;

DETAILED DESCRIPTION

Computer System

Figure 1:
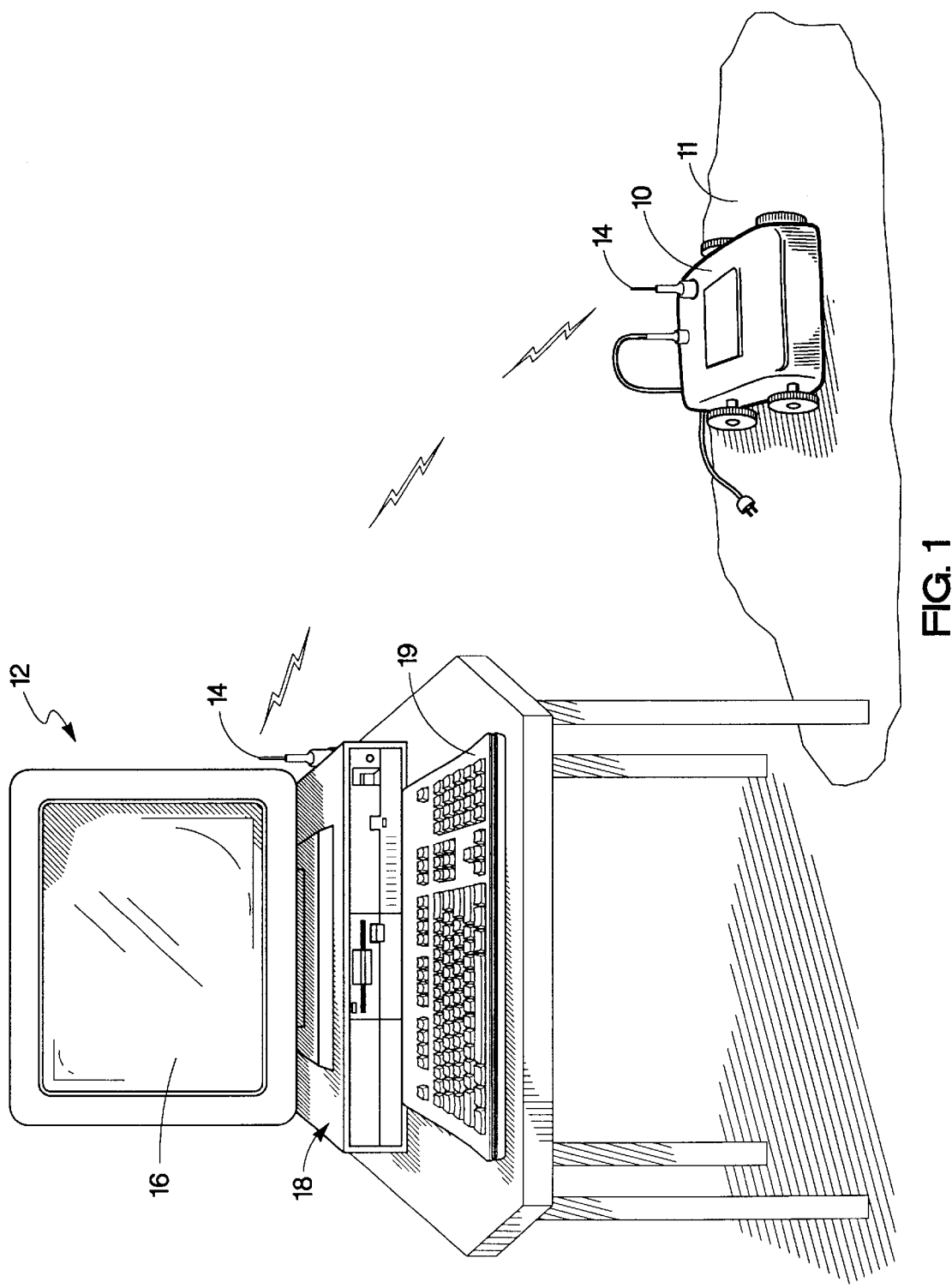
FIG. 1 is an illustration of a computer system with a floor printer in accordance with one embodiment of the present invention.

FIG. 1 of the present invention shows a floor printer 10, a computer system 12, and an interface 14 connecting the floor printer 10 to the computer system 12. The host computer system 12 includes a monitor display 16, a main processor 18, and a keyboard 19. The computer system 12 is be a desktop computer as shown in FIG. 1, a personal digital assistant known as a PDA (not shown), a laptop/mobile computer (not shown), palm pilot, calculator, an e-book, or any system that is capable of handling the printing software. In another embodiment, the central processor with a disk drive (floppy or CD) is in the floor printer 10. In one embodiment, the monitor is coupled with the floor printer.

In the embodiment shown in FIG. 1, the floor printer 10 is on a medium 11. The medium 11 is a surface that is capable of having an image printed on it. For example, the medium is a paper substrate, a plastic substrate, a wooden substrate, a glass substrate, a composite substrate, a metallic substrate, a layered substrate with several different materials, or other medium that has a surface for an image to be printed. In particular, the surface is the floor or ground, such as concrete, linoleum, tile, or another material that is capable of being walked upon.

The floor printer uses data input and output protocols for print file transfer between the computer system and the floor printer. The floor printer uses one of a floppy drive, an Ethernet port, parallel port, flash card, USB, infrared/wireless protocols, and a PCMCIA card to communicate with the computer system. In FIG. 1, the interface 14 is wireless. Components of the interface 14 are on both the system 12 and the floor printer 10, as shown in FIG. 1. In another embodiment, the interface 14 is a cable (not shown).

Figure 2:
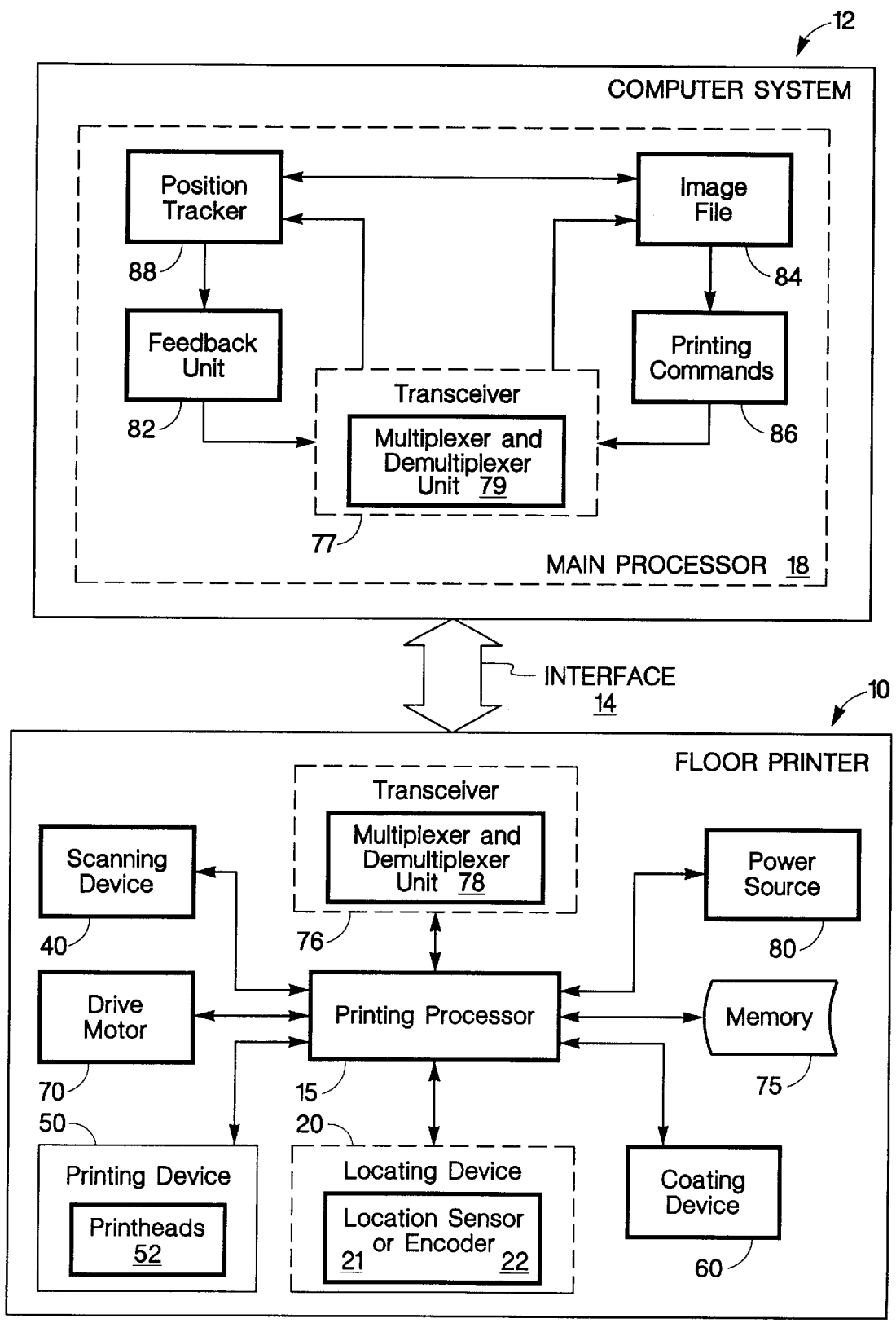
FIG. 2 illustrates a block diagram of the components of one embodiment of the floor printer and a main processor of the computer system.

In an embodiment shown in FIG. 2, the interface 14 includes transceivers 76, 77 in the floor printer and the computer system, respectively. The transceivers 76, 77 correspond to each other and enable data to be wirelessly transmitted and received in between the floor printer and the computer system. In the wireless connection embodiment, the data is transmitted in a form of infrared or radio frequency signals. In one embodiment shown in FIG. 2, the transceivers 76, 77 each have a multiplexer and demultiplexer unit 78, 79, respectively, such that the signals are combined into a single signal for transmission, and divided again upon receipt. Alternatively, each signal is transmitted separately. In an alternative embodiment, the multiplexer and demultiplexer unit 78, 79 is used with the cable.

As shown in FIG. 2, the main processor 18 has a feedback unit 82, an image file 84, printing commands 86, and a position tracker 88. The floor printer prints segments of the image onto the medium as the floor printer travels across the medium or floor during a printing process. Each segment of the image is printed onto a particular location on the medium to form a composite of an image stored as image data in the image file 84. The image data is used to generate printing commands 86 or signals which are transmitted to a printing processor 15 through the interface 14. In one embodiment, the image data is then stored in a memory 75 of the floor printer. In another embodiment, the printing processor 15 converts the image data signals into print data and sends to a printing device 50 that portion of the print data representing the portion of the image that is to be printed. In an alternative embodiment, the image data is converted with software in the computer 12.

Floor Printer

In one embodiment, the floor printer 10 has at least one of horizontal, vertical, diagonal, and even circular printing paths while the printing device is operating. In one embodiment, the direction of the floor printer 10 does not affect the printing process described above.

The principal function of the printing processor 15 of the floor printer is to acquire the data from various sensors of the floor printer in ways that correspond to a mode of operation of the floor printer. The printing processor 15 signals software in the main processor 18 of the computer of the operation that is occurring, such as scanning, locating, printing and coating, as described in more detail below.

As shown in the embodiment of FIG. 2, the printing processor 15 is coupled with the interface 14, a locating device 20 acquiring and processing position information, a scanning device 40 producing image data, the printing device 50 printing print data, a coating device 60 temporarily or permanently affixing the printed image and/or depositing a top coat, a drive motor 70 automatically moving the floor printer, a memory 75 storing image data and/or print data, and a power source 80. The printing processor 15 has a navigation mode associated with the locating device 20, a scan mode associated with activating the scanning device 40, and a print mode associated with activating the printing device 50. The floor printer 10 is capable of operating in the print mode, in the coat mode, and in the navigation mode without the aid of the scanning device 40. In an alternate embodiment, there is no scanning device to produce image data.

The printing processor 15 indicates to the power source 80 to provide power to the locating device 20, the printing device 50, the scanning device 40 and/or the coating device 60. In one embodiment, the power source 80 is the battery supplying power to the electronic components of the floor printer 10. In one embodiment, the battery is a rechargeable nickel-cadmium battery or an alkaline battery. The power supply 80 in the floor printer 10 is capable of being eliminated if, alternatively, the cable is used to establish the communication link between the floor printer 10 and the computer system 12. In this embodiment, a supply of power is transferred from the host computer system 12 to the floor printer 10 through the cable.

The arrows to and from the printing processor 15 indicate the flow of data. More particularly, the printing processor 15 responds to data signals received through the interface 14 with the computer system 12. The scanning, locating, printing and coating devices provide data back (and forth) to the printing processor 15, as described in more detail throughout the application.

In one embodiment, the memory 75 is a dynamic random access memory device. In one embodiment, the storage capacity of the memory 75 varies depending on the number of location sensors (or encoders) 21, 22 utilized by the floor printer 10. In one embodiment, the memory 75 stores printer driver software pre-programmed to convert image data to print data. In another embodiment, the memory 75 is coupled to read-only memory (not shown) that is programmed with the printer driver software.

In an alternative embodiment, the floor printer 10 does not contain the processor 15 and the memory 75. The functions of the processor 15 and the memory 75 are performed by the host computer system 12. However, the printing operation of the floor printer 10 in this embodiment functions in the same manner as described below.

Figure 3A:
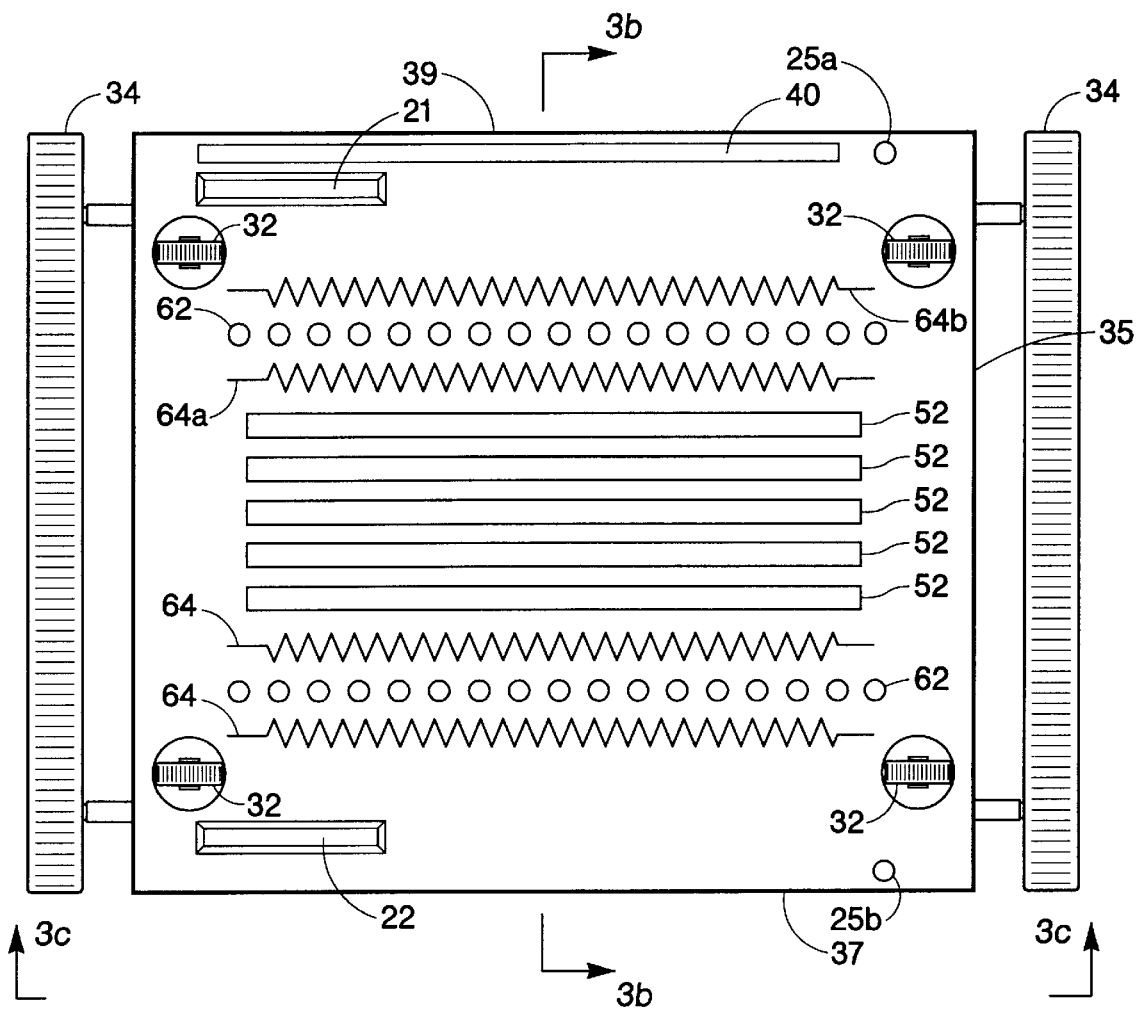
FIG. 3a is a bottom view of an embodiment of the floor printer.

As shown in a plan view of an underside of the floor printer 10 in FIG. 3*a*, the floor printer has a housing 30 with a bottom 31, side edges 35, a front edge 37 (facing the direction of printer movement), and a back edge 39 opposite the front edge. Along the bottom 31 is the printing device 50 with printheads 52, a scanning device 40, the locating device (or position tracker) 20 with locating sensors (or encoders or fiducial trackers) 21, 22 and at least one fiducial nozzle 25, and the coating device 60 with nozzles 62 and at least one heater 64. The positions of the printheads 52, the location sensors 21, 22, heaters 64, coater solution nozzles 62, wheels 32, and treads 34 shown in FIG. 3*a* is one example of the arrangement of the components. The arrangement is capable of varying. The number of the location sensors, fiducial nozzles 25, heaters 64, printheads 52, and coater solution nozzles 62 vary with different embodiments. In one embodiment there is no scanning device 40. In another embodiment, there is no heater 64. In another embodiment, there are no coater solution nozzles 62.

Figure 3C:
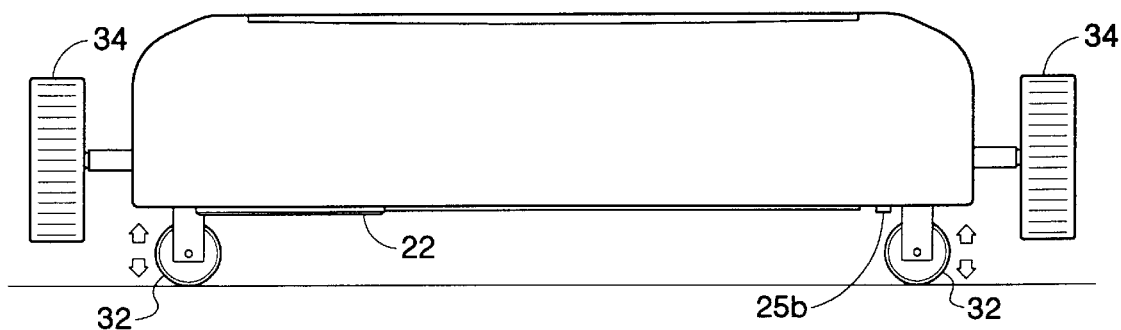
Figure 3B:
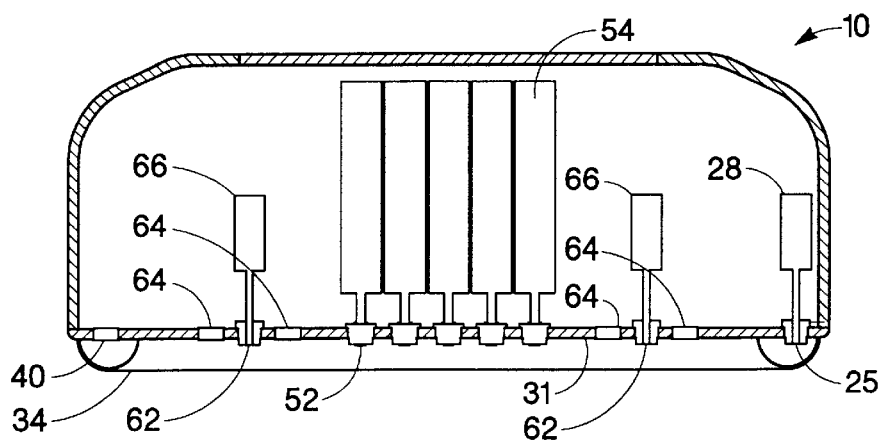

In this embodiment, there are five (5) printheads 52. The arrangement shown in FIG. 3*a* is known as a page wide array of printheads. As shown in FIG. 3*b*, the five printheads 52 are coupled with five fluid reservoirs 54 that correspond to cyan, magenta, yellow, black and white colored fluids, respectively. In another embodiment, there is one (1) printhead 52 and one fluid reservoir that is supplied with black ink. In another embodiment, there are three (3) printheads and three fluid reservoirs corresponding to cyan, magenta, and yellow colored fluids. In another embodiment, there are four (4) printheads and four fluid reservoirs corresponding to the same three colored fluids plus black or white. As shown in FIG. 3*b*, each printhead 52 is coupled with a corresponding fluid refill reservoir 54. In one embodiment, the printhead 52 is directly connected with the reservoir 54 and receives the fluid directly therefrom. In another embodiment, the printhead 52 is enclosed in an inkjet cartridge 53, and the ink jet cartridge is refilled periodically with the fluid in the reservoir 54. The inkjet printer cartridge has a supply of print-forming material, such as ink, and the print head that deposits the print-forming material. In one embodiment, the inkjet cartridge is one of those used in Hewlett Packard's line of Deskjet printers. In one embodiment, the print-forming material is instant-drying ink such that the contact between the floor printer and the ink does not smudge the medium 11. In another embodiment, after the image is printed, at least one of the heaters 64 dries the print-forming material. Operation of the heaters is described in more detail below.

In the embodiment shown in FIG. 3*a*, the scanning device 40 scans an image on the medium 11 using a sensor similar to the optical sensor described below with respect to FIG. 9. The scanned image data is converted to signals that are transmitted to the main processor 18 through the interface 14. The main processor 18 displays the image on the monitor 16 or stores the image in the image file 84.

In one embodiment, the drive motor 70 of the printing processor 15 is coupled with the translational mechanism (the wheels 32, 33, tank treads 34, rollers 36, or trackball) to move the floor printer 10 in response to the printing processor 15. As shown in the directional arrows between components of the floor printer in FIG. 2, the printing processor 15 receives navigation data from the location sensors (discussed below) to signal the drive motor 70 to move the printer housing according to the position information received. In another embodiment, the floor printer is maneuvered manually.

The coating device 60 has coater solution nozzles 62, and at least one heater 64, 64a, 64b as shown on the bottom 31 of the housing 30 in FIG. 3a. The coating device 60 temporarily or permanently affixes the printed image to the medium and/or deposits a top coat to the printed image. In one embodiment, the heater is made of a coil, such as a metal coil, or a ceramic coil. In one embodiment, current is passed through a resistive metal and the metal increases in temperature accordingly.

In one embodiment, the nozzles 62 spray coater solution as a top coating of clear wax, such as floor wax. In another embodiment, the coater solution is a top coating of clear laminate or plastic. In another embodiment, the coater solution is a top coat composed of a material that is easily removable by a stripping material. It is desirable to have a coater solution material that is rugged and durable in high traffic areas. Affixing the printed image with the coater solution may be temporary, as little as a day in length, to something more permanent or indefinite. In one embodiment, the coater solution material is periodically reapplied to prevent inadvertent wearing of the printed image. In one embodiment, the nozzles 62 spray a fine spray. In another embodiment, the coater solution uses nozzles 62 that spray with a gross nozzle array, as opposed to a fine nozzle spray.

After the coater solution is deposited, at least one of the heaters 64 dries the solution. In one embodiment, the coater solution is a plastic laminate, and the heater 64 polymerizes the plastic laminate to harden the coating over the printed image. In the embodiment shown in FIG. 3a, the floor printer 10 moves in a direction towards the bottom of the page, where the front edge 37 is leading. In this embodiment, the heaters 64a, 64b nearest the back edge 39, that pass over the medium after the printheads 52, are utilized. A first set of heaters 64a heat the print-forming material or fluid deposited by the printheads 52. The coater solution nozzles 62 between the first and second set of heaters 64a, 64b, respectively, then spray the printed image as the nozzles 62 pass over the printed image. The second set of heaters 64b heat and dry the coater solution. In an alternate embodiment, where the printer 10 is moving in an opposite direction towards the top of the page with the back edge 39 leading, the nozzles 62 and the heaters 64 nearest the front edge 37 are used.

In one embodiment, the velocity of the floor printer is coordinated with the rate of printing from the printheads. In one embodiment, the tracking scanners 21, 22 periodically send positional signals to the printer processor 15. In response, the printer processor 15 sends signals to the printing device 50 and/or the tracking scanners regarding rate of printing and/or rate of travel, respectively, in order to coordinate.

In this embodiment, the translational mechanism is tank treads 34 along each side edge 35. Along each side edge 35 is a belt that is looped about the two wheels 32. The belt has treads for maximizing traction and friction, in order to minimize slippage of the printer on the medium. The treads 34 support the printheads 52 a predetermined distance from the media 11 and enable the floor printer to translate across the media, as described in more detail below.

As shown in FIG. 3a, the locating device 20 has locating sensors (or encoders or scanners) 21, 22 and two fiducial nozzles 25a, 25b on the bottom 31 of the floor printer. One of the fiducial nozzles 25a is near the front edge 37, and the other 25b is near the back edge 39. The fiducial nozzles are adjacent the same side edge 35. The locating sensors 21, 22 are adjacent the opposite side edge 35. One of the locating sensors 22 is near the front edge 37, while the other locating sensor 21 is near the back edge 39. The nozzles 25a, 25b are further outboard than the locating sensors 21, 22: the nozzles are closer to the front and back edges 37, 39, than the locating sensors 22, 21, respectively. In the embodiment shown, the locating sensors 21, 22 are adjacent the heaters 64. In one embodiment, the fiducial nozzles 25a, 25b are misaligned with and spaced from the printheads 52 such that a fiducial marking 29 (or fiducial or fiducial line) is prevented from interfering with image printing, and vice versa.

Figure 3D:
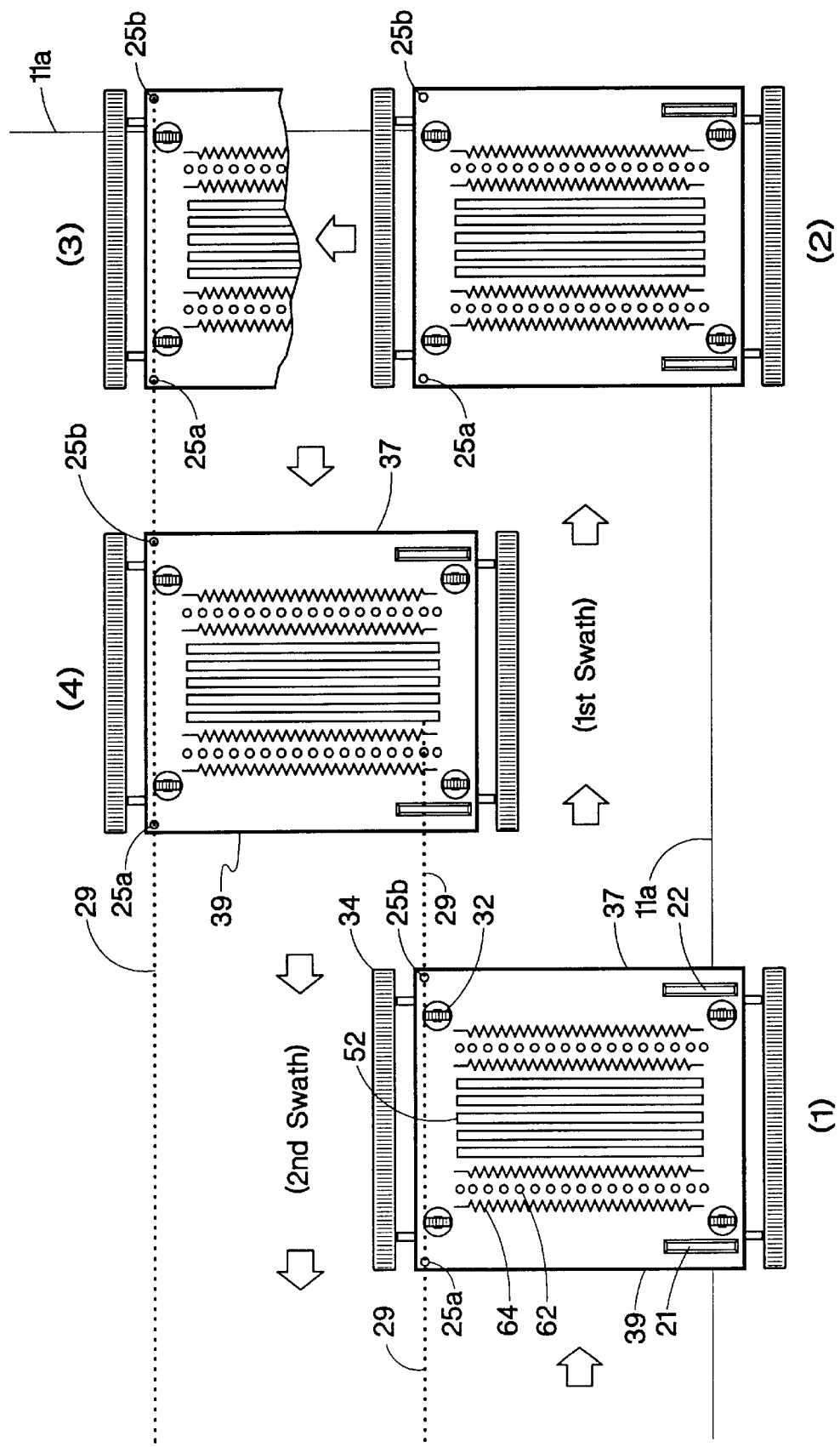

The fiducial nozzles 25a, 25b deposit a fiducial marking 29 as the image is printed, as shown in FIG. 3d. As the treads 34 move the printer along in a substantially straight line along a print swath, the fiducial nozzles deposit a substantially straight fiducial marking 29. As shown in FIG. 3d, the floor printer 10 of FIG. 3a changes directions in between print swaths. Four main steps are shown in FIG. 3d corresponding to floor printer 10 in four different positions (1), (2), (3), and (4). In a first print swath shown, the floor printer 10 begins printing an image with the printing device 50 and begins depositing the fiducial marking 29 with the fiducial nozzle 25a nearest the back edge 39 along side the printed image. At some point, the nozzle 25b joins the nozzle 25a to print the fiducial marking 29 up to a print boundary 11a at the end of the first print swath. The fiducial marking 29 from the nozzle 25a couples with the fiducial marking 29 from the nozzle 25b for a substantially continuous marking 29.

In one embodiment, as the printer 10 reaches the print boundary 11a, the location sensor 22 senses the print boundary 11a. The printing processor 15 receives a signal (in one embodiment from the tracking scanners 21, 22) that the print boundary is reached, and then sends a signal to the translational mechanism to lower or extend the wheels 32, as appropriate. In one embodiment, the wheels 32 extend down to lift the printer to take the load from the treads 34, as shown in FIG. 3c. The wheels 32 translate the printer sideways a distance approximately equal to the length of the printheads 52. The printer 10 is capable of determining an accurate distance to translate sideways due to the fiducial marking 29 and the sensors 21, 22. In this embodiment, as the sensor 21 reaches the line 29, the line 29 is detected and the sensor sends a signal to the printer processor to stop the sideways translation. The wheels 32 then retract to return the load back onto the treads 34 to translate the printer in the second print swath. The fiducial nozzle 25b begins depositing the fiducial marking 29, and the process continues with the back edge 39 leading the second swath. This process is continued until the image is at least substantially completely printed.

In one embodiment, there is a slight overlap between printheads 52 (and thus printer positions) in each successive print swath. In this manner, the distinction between print swaths is minimized. As shown in FIG. 3d, the fiducial marking 29 is printed along side the printed image in the first swath, the fiducial marking 29 is located by locating sensor 21 in the sideways printer movement and followed or tracked. The fiducial marking 29 is then printed over by the printheads 52 during the second swath. The process is repeated in the successive print swaths, however, the locating sensor switches between 21 and 22 accordingly. In the second swath path, the heaters 64 and coater solution nozzles 62 behind the printheads 52 and nearest to the front edge 37 are in operation. In the third swath path, similar to the first path, the heaters 64 and coater solution nozzles 62 behind the printheads 52 and nearest to the back edge 39 are in operation. In summary, the use or order of use for the fiducial nozzles, tracking scanners, heaters, and coater solution nozzles alternate for every print swath.

In the embodiment shown in FIG. 3d, during the first print swath a fiducial marking 29 is deposited that corresponds with the sensors 21, 22 in the second print swath. A mechanism for moving the printer in a substantially straight line during the first print swath is desired. In one embodiment, there are no fiducial markings for the printer to track during the first print swath. In another embodiment, the printer uses one of the mechanisms described herein to print in a substantially straight line during the first print swath.

It is desired that the first print swath be substantially parallel to each of the subsequent print swaths. Angle theta is defined as the angle difference between adjacent print swaths. It is desired that angle theta be minimized. In the embodiment shown in FIG. 4a, there are two fiducial nozzles 25 in each of two adjacent corners along a side edge 35. The two fiducial nozzles 25 together deposit a thick fiducial marking. In another embodiment, the two fiducial nozzles deposit two substantially parallel fiducial markings. With two substantially parallel fiducial markings sensed by the tracking sensors 21, 22 during printing the angle theta is minimized because the tracking sensors have two reference lines with which to align (see FIG. 7c for an illustration of two parallel fiducial markings).

In one embodiment, the fiducial nozzles are offset from each other, in that they do not parallel the front or back edge of the printer. In this embodiment, one fiducial nozzle deposits before the other, or the fiducial nozzles deposit in succession.

Figure 4A:
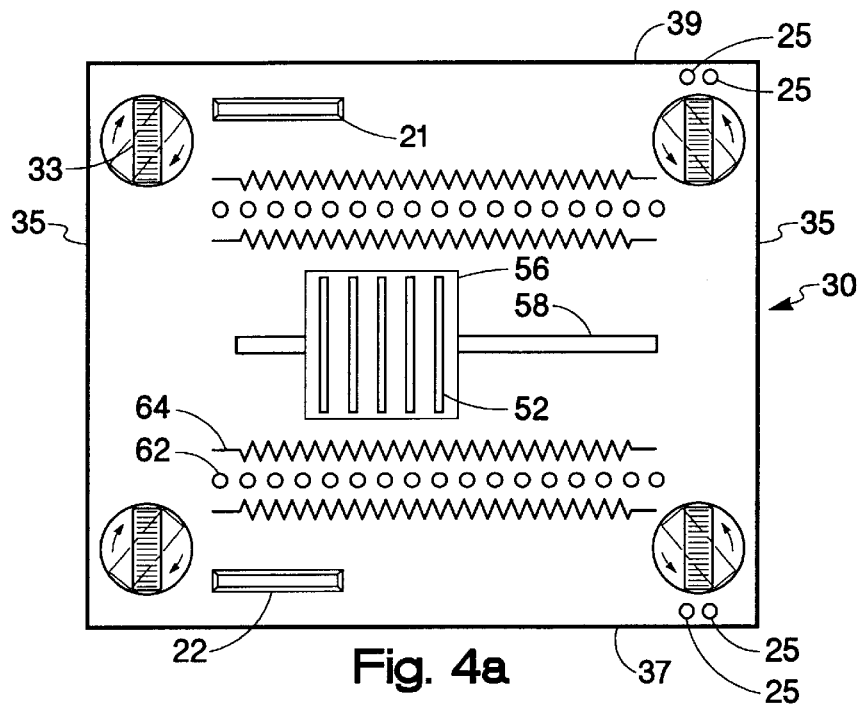
FIG. 4a is a bottom view of another embodiment of the floor printer.
Figure 4B:
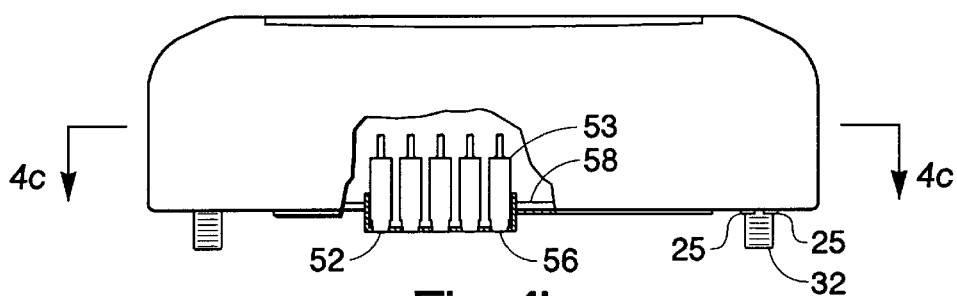

In FIGS. 4a and 4b, wheels 32, 33 extend from the bottom corners of the housing 30. Two wheels 32 are coupled inside the side edges 35 near the back edge 39 of the housing 30. Two other wheels 33 are coupled inside the side edges 35 near the front edge 37 of the housing 30. In the embodiment shown, the wheels 32 are capable of rotating in one direction with respect to the housing 30: the wheels 32 rotate in a plane perpendicular to the housing as they move the printer along. Wheels 33 are capable of rotating in two directions with respect to the housing 30: the wheels 33 rotate in a plane perpendicular to the housing as they move the printer along, and another plane parallel to the housing as the printer turns direction, as described in more detail below with respect to FIGS. 6a and 6b.

As shown in FIGS. 4a and 4b, the printing device 50 is a carriage 56 that moves along a slide rod 58 on the bottom 31 of the housing of the floor printer. The printheads 52 print the image as the carriage moves along the slide rod. In one embodiment, the floor printer stops moving until the carriage completes a print swath. After the carriage completes the print swath, the floor printer steps one print swath height and stops again. The print swath height is substantially equal to the printhead length. Accordingly, a bottom of a previous print swath aligns with a top of a current print swath. In another embodiment, the velocity of the floor printer is coordinated with that of the carriage velocity to maximize the print quality. When the carriage is moving too slow in relation to the speed of the floor printer, the image spreads out over the medium, successive print swaths are not adjacent and thus the image printed is not adjacent with the previous print swath. Image quality suffers as a result. When the carriage is moving too fast in relation to the speed of the floor printer, the image in a print swath is printed over a previous print swath image. The image is then compressed and print quality suffers as a result. In one embodiment, the tracking scanners 21, 22 periodically send positional signals to the printer processor 15. In response, the printer processor 15 sends signals to the printing device 50 and/or the tracking scanners regarding velocity and/or position in order to coordinate accordingly.

As shown in FIG. 4b, in the carriage 56 is at least one print cartridge 53. In the embodiment where there is one cartridge 53, the cartridge has multiple printheads 52 corresponding to the number of fluids or colors desired in printing the image. In the embodiment where there are multiple cartridges, the cartridges have at least one printhead, and the number of cartridges generally corresponds to the number of fluids or colors desired in printing the image. Generally, this embodiment of FIG. 4a has a lower print quality than the print quality of FIG. 3a with printheads across the entire length of the floor printer.

Figure 4C:
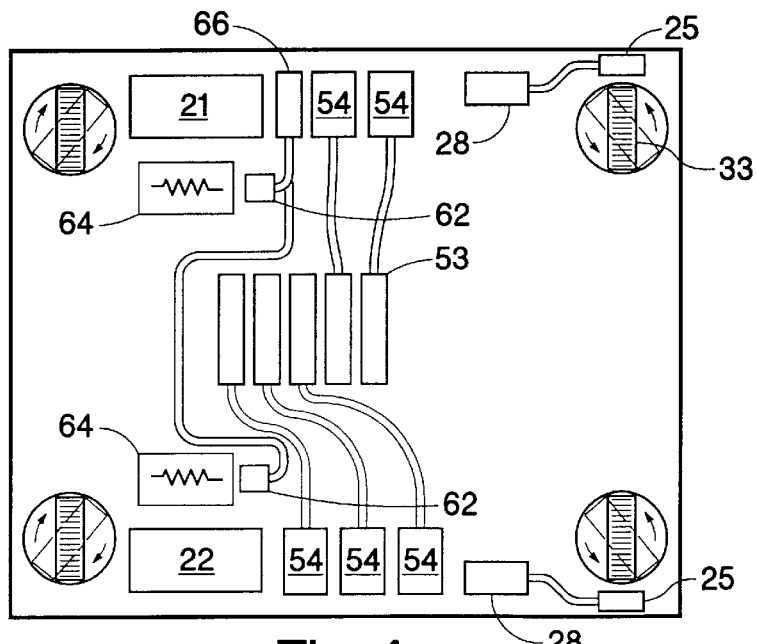
FIG. 4c is a schematic view of the floor printer viewed from section 4c—4c of FIG. 4b.

FIG. 4c illustrates a schematic view of some of the inner workings of the floor printer 10. The coating device 60 includes a mechanism for the heater 64, and a coater solution reservoir 66 coupled with the coater solution nozzles 62. The printing device 50 includes printheads on inkjet cartridges 53, such as the inkjet cartridges that are used in Hewlett Packard's line of Deskjet printers. The inkjet printer cartridge has a supply of print-forming material, such as ink, and a print head that deposits the print-forming material. Each cartridge 53 is coupled with a corresponding fluid refill reservoir 54, such as cyan, magenta, yellow, black and white colored fluids. In another embodiment, there is one (1) cartridge 53 with different fluid chambers, supplied with one fluid or fluid type, such as black ink, or multiple fluid types, such as at least one of cyan, magenta, yellow, black and white colored fluids. The different fluid chambers of the one ink jet cartridge 53 is refilled periodically with the fluid in the reservoirs 54, accordingly. In one embodiment, the inkjet cartridge 53 is refilled when the floor printer 10 is switching or translating between two print swaths. In one embodiment, the print-forming material is instant-drying ink such that the contact between the floor printer and the ink does not smudge the medium 11. In another embodiment as described above with respect to FIG. 3a, after the image is printed, at least one of the heaters 64 dries the print-forming material. Operation of the heaters is described in more detail below.

Figure 5:
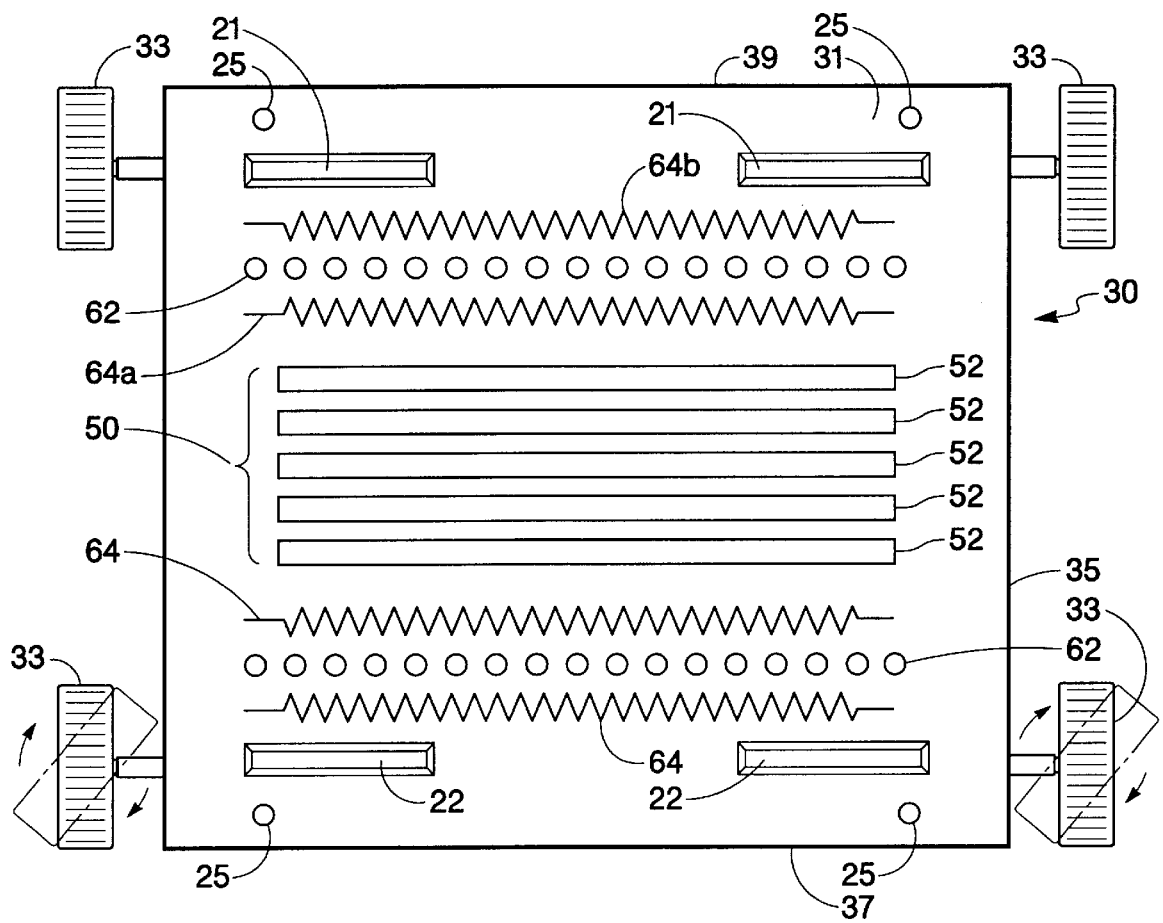
FIG. 5a is a bottom view of another embodiment of the floor printer.

FIG. 5 illustrates another embodiment of the floor printer. Two wheels 33 are coupled along the side edges 35 near the back edge 39 of the housing 30. Two other wheels 33 are coupled along the side edges 35 near the front edge 37 of the housing 30. Wheels 33 are capable of rotating in two directions with respect to the housing 30: the wheels 33 rotate in a plane perpendicular to the housing as they move the printer along, and another plane parallel to the housing as the printer turns direction, as described in more detail below. In one embodiment, the translational mechanism (for example: wheels 32, 33, tank treads 34, rollers 36, or trackball) is made of an elastomer material or another material/design that maximizes the frictional contact between the mechanism 32, 33, 34, 36 and the medium 11.

As shown, the locating device 20 has locating sensors (or encoders) 21, 22 and fiducial nozzles 25 on the bottom 31 of the floor printer. In one embodiment, there are four fiducial nozzles 25, one in each corner of the bottom of the printer 10, and four adjacent locating sensors 21, 22. The nozzles 25 are further outboard than the locating sensors 21, 22: the nozzles are closer to the side edges 35, and the front and back edges 37, 39, than the locating sensors. In the embodiment shown, the locating sensors 21, 22 are adjacent the heaters 64, 64b. In one embodiment, the fiducial nozzles 25 are misaligned with and spaced from the printheads 52 such that fiducial marking is prevented from interfering with image printing, and vice versa.

The fiducial nozzles 25 deposit a fiducial marking as the image is printed. As the wheels 33 move along in a substantially straight line along a print swath, the fiducial nozzles deposit a substantially straight fiducial marking. Similar to the embodiment shown in FIG. 3d, the floor printer changes directions in between print swaths. As the printer 10 reaches a print boundary, the location sensor 22 senses the print boundary. In one embodiment, the wheels 33 turn to a perpendicular position and translate the printer sideways a distance approximately equal to the length of the printheads 52. The printer 10 is capable of determining an accurate distance to translate sideways due to the fiducial marking 29 and the sensors 21, 22. In this embodiment, the sensor 21 detects the line 29 and sends a signal to the printer processor to stop the sideways translation. The wheels 33 then turn back to translate the printer in the second print swath. The fiducial nozzle 25 begins depositing the fiducial marking 29, and the process continues with the back edge 39 leading the second swath. This process is continued until the image is at least substantially completely printed.

Because of the positioning of the fiducial nozzles and the sensors in each of the four corners, the printer shown in FIG. 5 is able to be positioned upon the floor at a predetermined x, y coordinate and print in any of the four linear directions. In particular, this design enables the printer to print towards the front edge 37 or the back edge 39 as desired. Upon reaching one of the print boundaries, the printer translates sideways in either of two directions, depending upon the desired location for the second print swath. In this embodiment, there is less user interface because the printing processor 15 deposits the print image and the fiducial marking in response to the coordinates on the medium. In the other embodiments, such as the one of FIG. 3a, the printer is positioned in the starting corner. In particular, as shown in FIG. 3d, the side edge 35 adjacent the tracking scanners 21, 22 is at the top of the printed image during each and every print swath. However, for the embodiment of FIG. 5, the tracking scanners are adjacent each of the side edges 35.

Figure 6A:
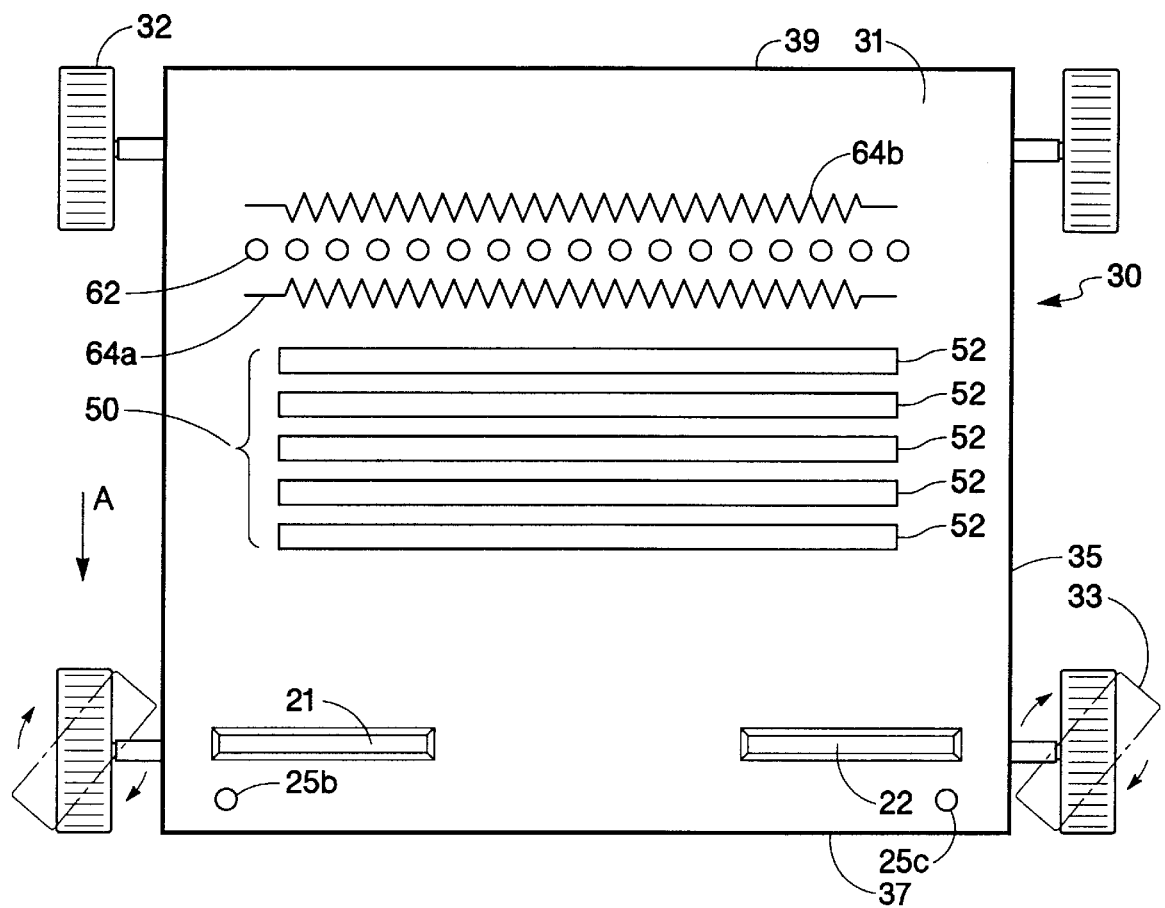
FIG. 6a is a bottom view of another embodiment of the floor printer.

The embodiment shown in FIG. 6a, near the back edge 39 are a set of heaters 64a, 64b, with coater solution nozzles 62 therebetween. Adjacent the heaters 64a are the printheads 52. On one side of the printheads 52 are the heaters and coater solution nozzles, on the other side of the printheads are the location sensors 21, 22 and fiducial nozzles 25b, 25c. The floor printer 10 moves in a print direction, as shown by arrow A, where the front edge 37 leads. The heaters 64a, 64b and coater solution nozzles 62 are similar to those described and shown with respect to FIG. 3a. In one embodiment, there are two location sensors 21, 22, and the two fiducial nozzles 25b, 25c along the front edge 37. One of the sensors and one of the nozzles are in each front corner. Compared with the sensors 21, 22, the nozzles 25b, 25c are nearest the front edge 37. The location sensors 21, 22 are in between the nozzles 25b, 25c and the printheads, respectively. In one embodiment, one end of each location sensor is positioned adjacent the nozzle, such that a portion of each location sensor overlaps the area in which the printheads are to print during a particular print swath, as shown in FIG. 6b.

Figure 6B:
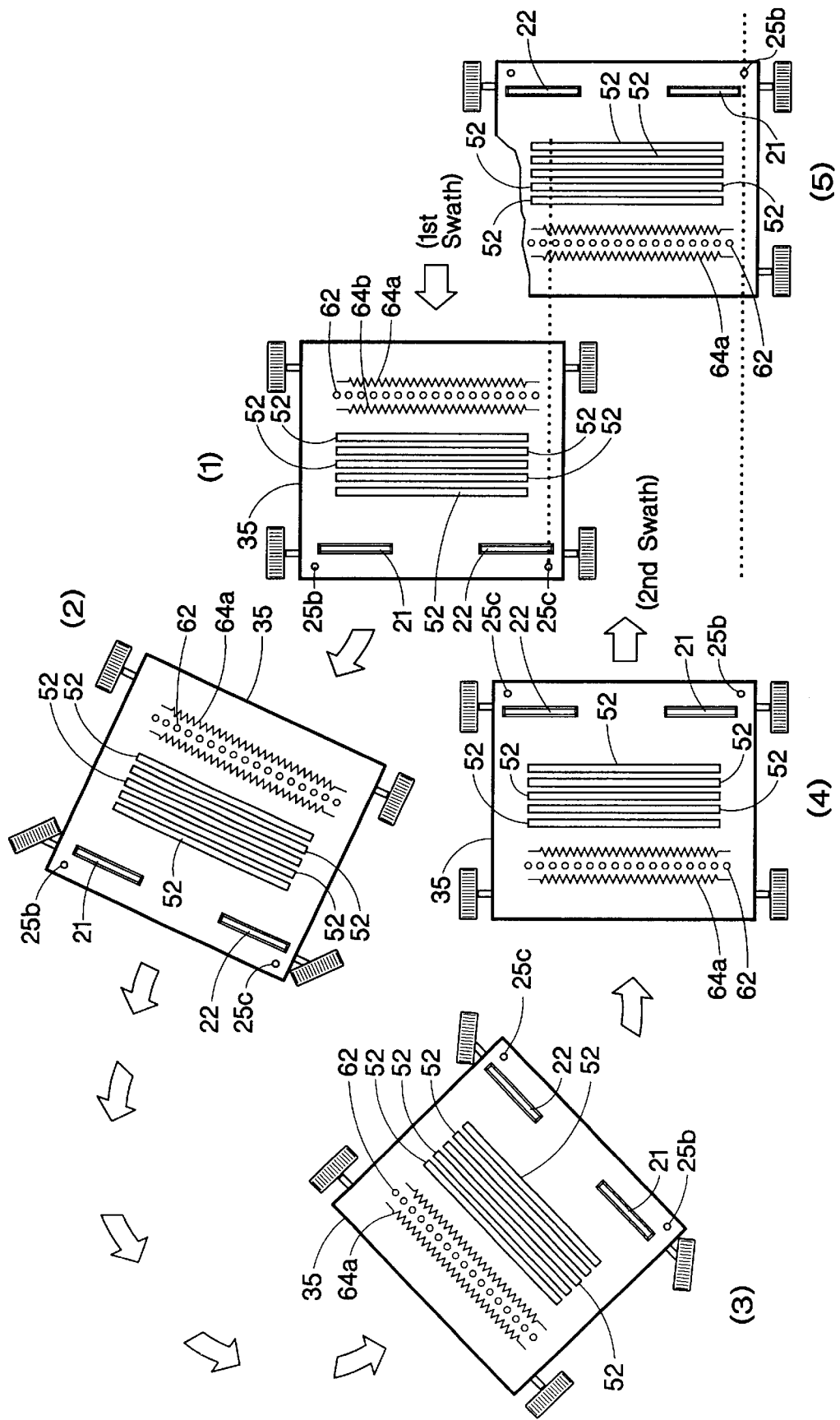

FIG. 6b illustrates a schematic view of the floor printer of FIG. 6a turning around in between print swaths. As the wheels 32, 33 move along in a substantially straight line along a print swath, the fiducial nozzles 25b, 25c deposit a substantially straight fiducial marking 29 as the image is printed.

The difference from the turn of FIG. 3d is that the front wheels 33 in the embodiment of FIG. 6b turn the floor printer 10 to do a "U-turn" through the four positions shown. The floor printer 10 changes directions in between print swaths. Five main steps are shown in FIG. 6b corresponding to floor printer 10 in four different positions (1), (2), (3), (4) and (5). In a first print swath shown, the floor printer 10 begins printing an image with the printing device 50 and depositing the fiducial marking 29 with the fiducial nozzle 25c nearest the side edge 35 that is adjacent the next swath path. The heater 64a heats the printed image, the coater nozzles 62 deposit the coater solution, and the heater 64b heats the coater solution. In this embodiment, the fiducial line 29 is out of the range of the printheads 52, the heaters 64a, 64b, and the coater nozzles 62, and is substantially unaffected thereby.

The printer 10 stops depositing the line 29 (as well as the image) when the wheels 33 begin to turn in the U-turn through positions (2) and (3). After the floor printer moves into position (4), the sensor 22 finds the fiducial line 29 and uses the fiducial line 29 to align the floor printer in the second swath path. At about the same time, nozzle 25b begins to deposit another fiducial line 29 for alignment in the next print swath shown as position (5). The process is repeated in the successive print swaths, however, the locating sensor switches between sensors 21 and 22, and the nozzles 25b and 25c also switch in successive print swaths, accordingly.

In this embodiment, there is a slight overlap between printheads 52 (and thus printer positions) in each successive print swath. As a result, the distinction between print swaths is minimized, and print quality is improved. In addition, the fiducial marking 29 printed in the first print swath is printed over by the printheads 52 during the second swath.

Figure 7A:
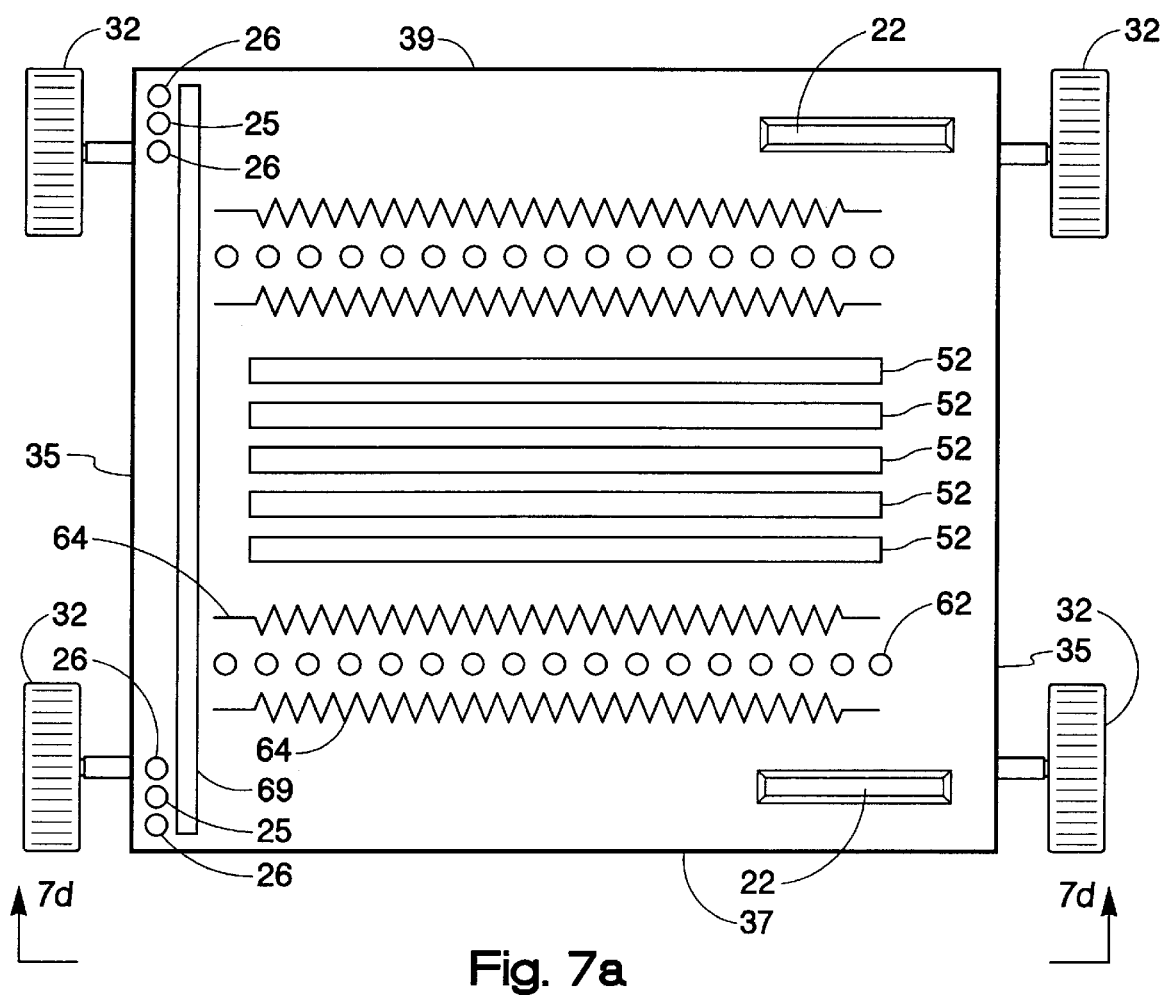
FIG. 7a is a bottom view of another embodiment of the floor printer.

In the embodiment shown in FIG. 7a, there are two sets of three fiducial nozzles 26, 25, 26 along a side edge 35 of the housing 30. In each set there are two spray fiducial nozzles 26 substantially aligned with a middle fiducial nozzle 25 in two adjacent corners of the bottom 31. In one embodiment, the three fiducial nozzles are substantially aligned with the directional movement of the printer. Along an opposite side edge 35 are two scanners or sensors 22, wherein there is one sensor in each corner along the opposite side edge 35.

Figure 7D:
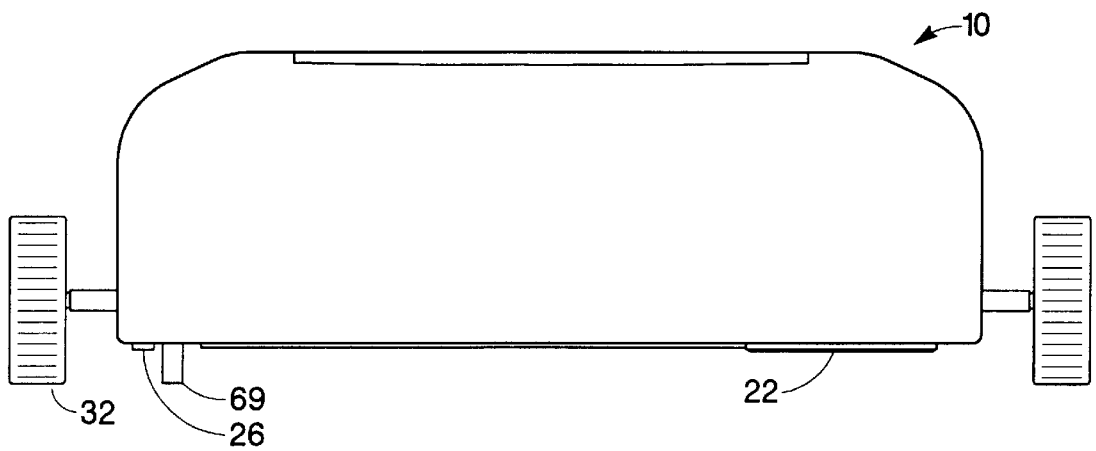
Figure 7B:
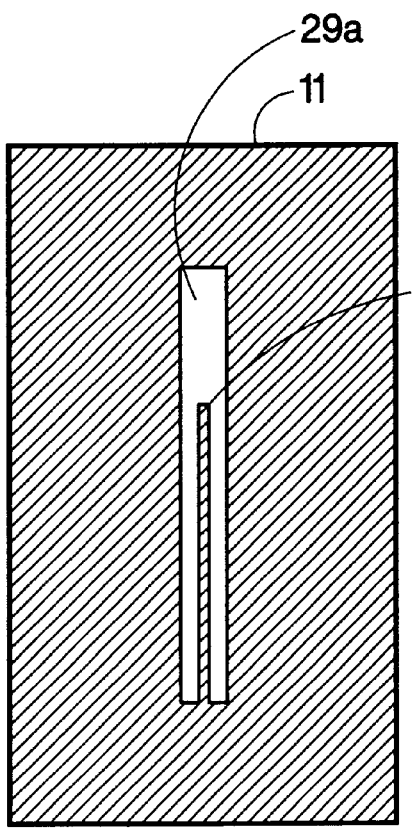

In one embodiment, as shown in FIG. 7b, the medium 11 has a low reflectance background. One of the nozzles 26 sprays a wide fiducial mark 29a that is highly reflective on the medium 11. The middle fiducial nozzle 25 immediately following the spray nozzle 26 then deposits a thinner fiducial mark 29b that is of low reflectance on the wide fiducial mark. During printing, one of the sensors 22 follows the low reflectance line 29b using the background of the highly reflective line 29a. In another embodiment, the sensor 22 follows a highly reflective line on a background of a lower reflectance (not shown). In one embodiment, absorption data and differences in absorption data are monitored in determining positional data.

Figure 7C:
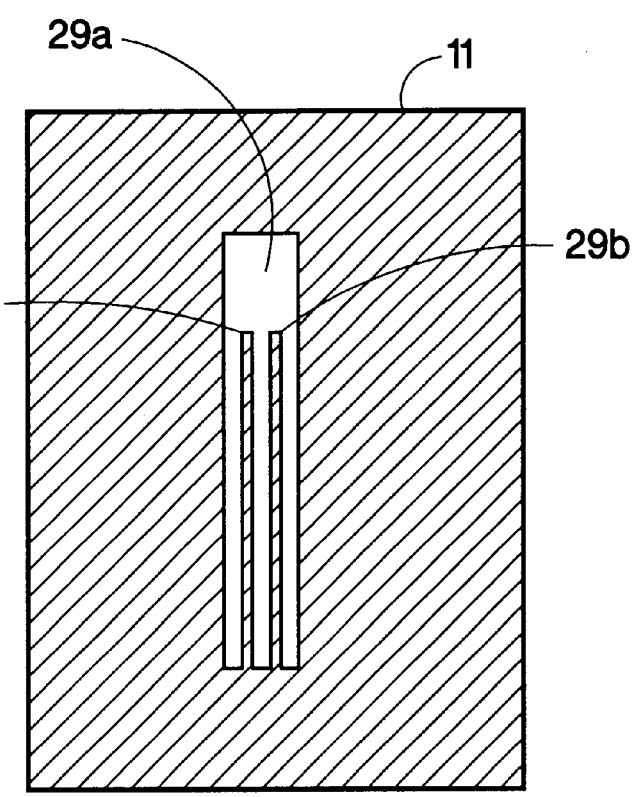

In another embodiment, shown in FIG. 7c, the medium 11 has a low reflectance background. In this embodiment, the locating device 20 has four nozzles, with two middle fiducial nozzles 25 in between spray fiducial nozzles 26 (not shown). Similar to the embodiment of FIG. 7b, one of the nozzles 26 sprays a wide fiducial mark 29a that is highly reflective on the medium 11. The middle fiducial nozzles 25 immediately following the spray nozzle 26 then deposit two thin fiducial marks 29b that are of low reflectance on the wide fiducial mark. During printing, the sensor 22 follows the low reflectance lines 29b using the background of the highly reflective line 29a. This embodiment aids in making subsequent print swaths substantially parallel to the first print swath. The two lines 29b aid the sensor 22 in minimizing the angle theta because the tracking sensors have two reference lines with which to align, similar to the embodiment discussed with regard to FIG. 4a.

FIG. 7d illustrates a front view of the floor printer shown in FIG. 7a. The floor printer 10 has a wall (or barrier) 69 adjacent the fiducial nozzles 25, 26, wherein the wall 69 separates the fiducial nozzle from at least one of the coater solution, the heaters and the printheads. In this embodiment, the fiducial mark 29, 29a, 29b is separated and protected from the printheads 52 printing the image, the heaters 64, 64a, 64b heating the image and the coater solution, as well as the coater solution sprayed from the nozzles 62. In this manner, the fiducial line(s) is/are able to be sensed by sensors 22 and followed by the scanner 22 during the print swath as desired. Only when the fiducial line is no longer being used, i.e. the printer is in the successive print swath, the fiducial line is covered by the printed image, heated by the heaters, and coated with coater solution.

In another embodiment, the fiducial marking is deposited after the printheads print, after the coater nozzles deposit a coating and after the heaters heat. In this way, the fiducial marking is not heated, nor deposited over.

Figure 8A:
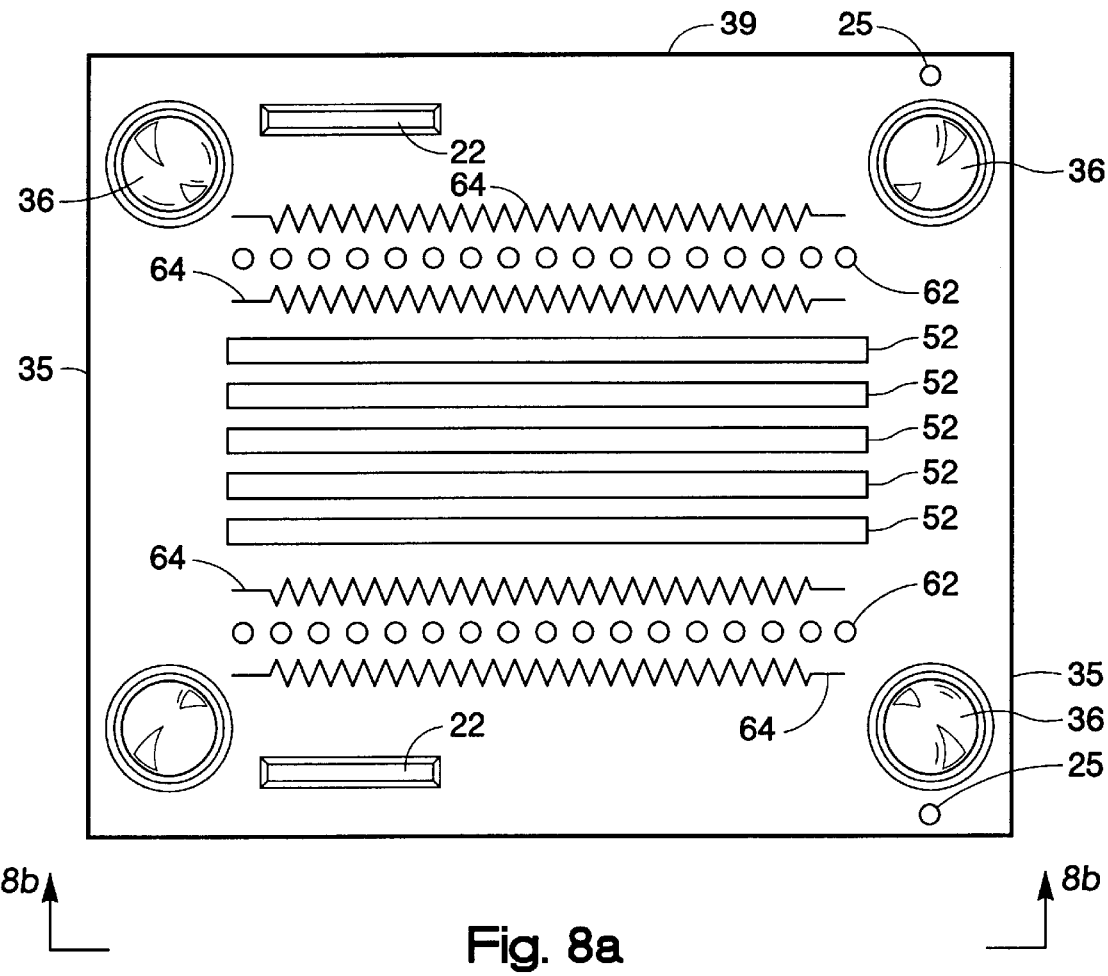
FIG. 8a is a bottom view of another embodiment of the floor printer.
Figure 8B:
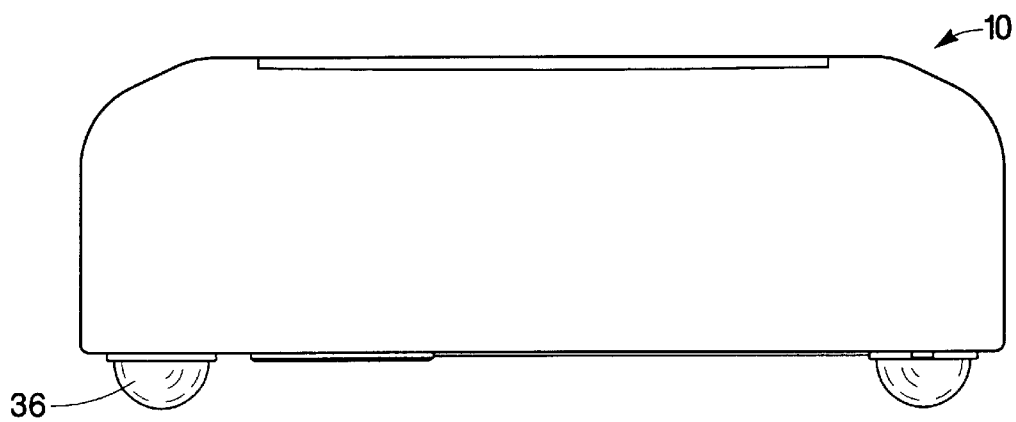

In FIGS. 8a and 8b, the floor printer 10 uses the translational mechanism with rollers 36. Like reference symbols in FIGS. 8a and 8b designate like parts of those embodiments previously described. In this embodiment, there are four rollers, one in each of the four corners on the bottom 31 of the housing. The rollers 36 enable the floor printer to translate in an x-direction and/or a y-direction. The change in direction in between print swaths operates in a manner similar to that shown in FIG. 3d, where the turn around of the printer includes translating the printer sideways (perpendicular) to the next print swath.

In an additional embodiment, the floor printer has a service station (not shown) that services the floor printer, including refilling ink, wiping and caping the print head. The service station has a priming system and a purge container. In another embodiment, the service station recharges the battery of the floor printer.

In one embodiment, the printed image upon the floor or ground is a promotional or seasonal item. Additionally or alternatively, the printed image on the floor is informational in nature. For example, the printed image is on a public sidewalk warning of a construction area. Those who are walking along an aisle or sidewalk, are likely to see the floor or ground about 10 feet ahead of where they are located. The printed image catches their eye and information is conveyed to the public accordingly. In another embodiment, the printed image is printed in the street. For example, the image indicates there is a school ahead, or a hospital ahead, or pedestrians crossing, or deer crossing.

The areas in which images are printed on the ground or floor include airports, malls, and retail stores, theaters, parks, but are not limited to these public areas. In addition, it is foreseeable that the floor printer is used in a private home to color and used to change floor patterns, perhaps in the kitchen or bathroom, as the material of the floor allows.

In alternative embodiments, the printing device uses at least one of digital printing and drop formation technologies including: electro-photography, dye sublimation, impact printing, piezoelectric drop ejection, and flex-tensional drop ejection.

In one embodiment, the bottom of the floor printer has an area that ranged from about 8 inches by 10 inches to about 2 feet by 4 feet. The height of the floor printer ranges from about 3 inches to about 2 feet.

Locating Device

In one embodiment, the fiducial marking 29 is a continuous line. In another embodiment, the fiducial marking 29 is a broken line, as shown in FIG. 3d. In another embodiment (not shown), the fiducial marking 29 is a series of cross hatches or cross hairs. In another embodiment, the fiducial marking is a first line that is substantially parallel to the print swath and a periodic second line (or cross hair) that is perpendicular to the first line. In one embodiment, the fiducial marking is different for each line or each swath marked. In another embodiment, the fiducial marking changes along the line or swath. For instance, there are a series of markings that represent a coordinate point along the fiducial marking line, e.g. 1, 11, 111, 1111, etc. along the line. In this way, the printer is aware of the relative position of the printer if the locating device 20 of the printer is placed over the fiducial marking line, as described in more detail below).

In one embodiment, the fiducial marking is black. In another embodiment, the fiducial marking is at least one of cyan, magenta, yellow, white, and a combination thereof.

In one embodiment, the printheads 52 are used to print the fiducial marking. In this embodiment, the printer does not have the fiducial nozzles 25, 26. The fiducial markings are deposited and sensed by the sensors 21, 22 in a manner similar to the fiducial markings deposited by the fiducial nozzles. In one embodiment, the printheads extend closer to the edges of the housing, such that fiducial markings are capable of being made at a furthest possible place from the image to be printed.

In one embodiment, the locating device 20 uses filtered light and a corresponding colored fiducial so that the sensor 22 follows the fiducial marking substantially accurately. The filtered light is shown onto the fiducial marking on the media. A signal response indicative of the difference between the media and the fiducial marking color is thereby created. In one embodiment, the signal response is reflectance data. The media reflects most of the filtered light and the fiducial marking absorbs most of the filtered light, thereby reflecting much less than the media. Using the reflectance data and an image processing apparatus, the location of the alignment fiducial is determined. In one embodiment, the image processing apparatus is similar to the apparatus described with respect to FIG. 9 below. For each primary colorant used as a fiducial, the corresponding filtered light is as follows. When printing a cyan fiducial on white media, a red filtered light is used. When printing a magenta fiducial on white media, a green filtered light is used. When printing a yellow fiducial on white media, a blue filtered light is used. When printing a black fiducial on white media, one of a red, green or blue filtered light is used.

In another embodiment, the locating device 20 uses an ultra violet light and a corresponding ultra violet fiducial marking. The UV light is shown upon the UV fiducial marking. The sensors of the locating device 20 sense the UV fiducial marking in a manner similar to that previously described to enable the printer to print substantially parallel print swaths. In another embodiment, the fiducial marking is water soluble. In another embodiment, the fiducial marking is thin and substantially undetectable from a short distance away, such as 3 feet.

In yet another embodiment, the locating device 20 does not use fiducial markings to track the position of the printer. Instead, optical wheel encoders are mounted on the drive axes of the translational mechanism (at least one of 32, 33, 34, and 36). In another embodiment, the optical wheel encoders are mounted on axes proportional to the drive axes. The optical wheel encoder is able to detect the rotational angle of the translational mechanism in contact with the surface of the medium. The rotational angle is used to determine relative positional change between the printhead and the medium, and thus the position of the printhead. In one embodiment, the location device 20 uses a sensor (not shown) positioned along side the translational mechanism. In another embodiment, the sensor is positioned over the translational mechanism inside the housing. A circular strip (not shown) having a plurality of substantially parallel lines is placed along a side of the translational mechanism adjacent the sensor. In one embodiment, the circular strip is placed on a side surface of the wheel. The number of lines on the encoder is calibrated to linear movement through program electronics. The sensor reads and counts the lines on the circular strip to determine the position and speed of the floor printer. This embodiment may be used where there is minimal slippage of the wheel relative to the medium. In another embodiment, in the event that the printer turns, a more complex type of sensor is desired to accurately determine the position and speed of the floor printer. For example, in the embodiment of FIG. 3a, one sensor is used with the wheels moving in an x-direction, and another sensor is used with the wheels moving in a y-direction perpendicular to the x-direction.

In another embodiment, the locating device 20 uses an optical correlator and includes a lens and an array of optoelectronic elements instead of using fiducial markings to track the position of the printer. In one embodiment, the optical sensor and supporting hardware is mounted on the housing near the printing surface. The optical sensor has the capability to generate encoder increments in two dimensions on a horizontal surface. Outputs of the encoder are counted to determine absolute position and to control the printer's speed. The size of the array of optoelectronic elements varies, depending on the type of optoelectronic elements used and the desired area of a medium to be captured. Hereby incorporated by reference are U.S. Pat. Nos. 5,644,139, 5,578,813, 5,927,872, and 5,994,710 describing devices and methods of forming scanned electronic images and related subject matter, more particularly, describing optical location sensors.

Figure 9:
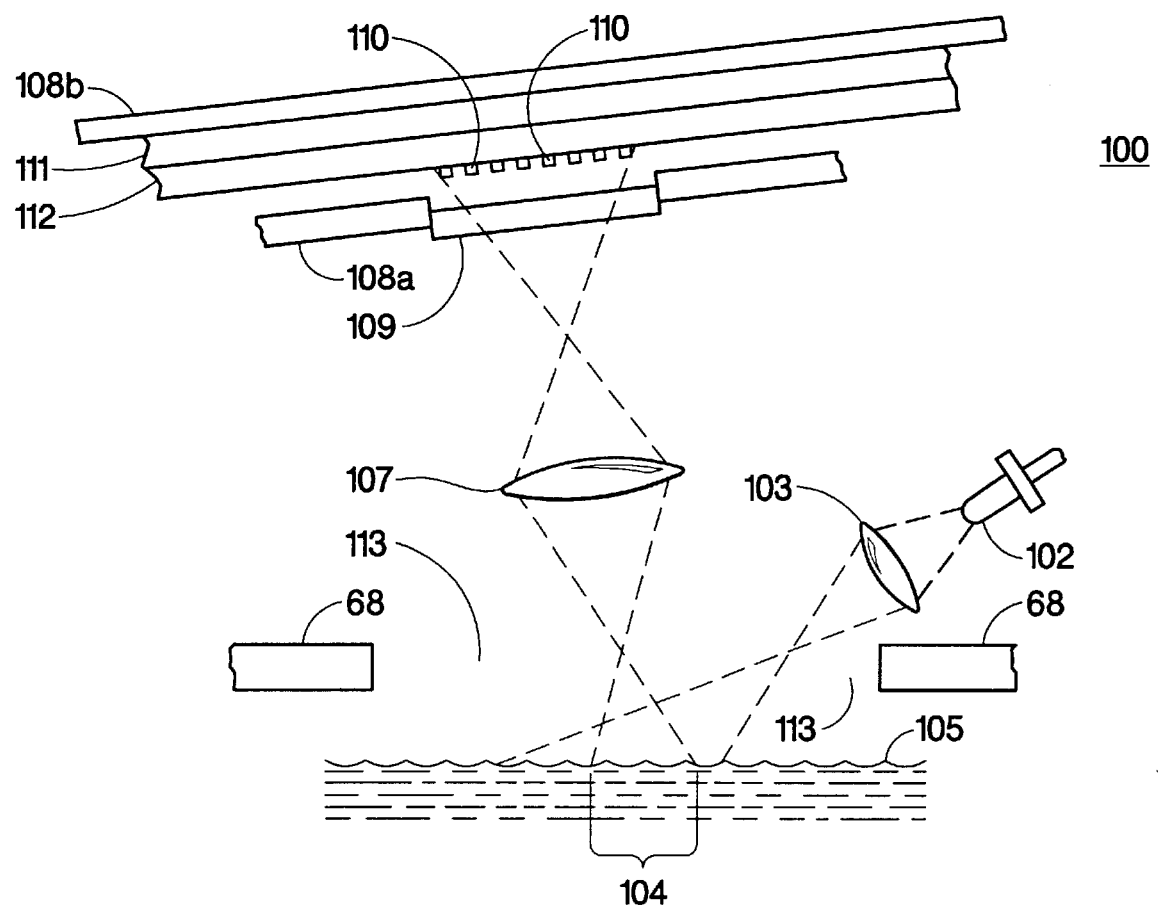
FIG. 9 is a simplified pictographic cut-away side view of an imaging and navigation arrangement.

In one embodiment, the optical correlator is as shown in FIG. 9. A simplified representation of a cut-away side view of an imaging and navigation arrangement 100 illustrates an embodiment of the locating sensors 21, 22 of the locating device 20. An LED 102, which is an IR LED, emits light which is projected by lens 103 (which instead of being separate is an integral part of the LED's package), through orifice 113 in bottom surface 68 of the floor printer 10 and onto a region 104 that is part of a work surface (medium) 105. Although it has been omitted for clarity, the orifice 113 might include a window that is transparent for the light from LED 102, and which serves to keep dust, dirt or other contamination out of the innards of the floor printer. Work surface 105 might be a floor, and might be the surface of nearly anything except smooth glass. Examples of suitable materials include, but are not limited to, tile, linoleum, paper, cloth, laminated plastic tops, painted surfaces, frosted glass (smooth side down), desk pads, real wood, fake wood, etc. Generally, any micro textured surface having features whose size falls within the range of 5 to 500 microns will do.

In one embodiment, the illumination of micro textured surfaces is effective when done from the side, as this accentuates the pattern of highlights and shadows produced by surface height irregularities. Suitable angles of incidence for illumination cover the range of about five to twenty degrees. A very smooth or flat surface (e.g., one that has been ground and polished) having simple variations in reflectivity owing to (micro scale) compositional variation works, too. In such a case, in one embodiment, the angle of incidence for the illumination approaches ninety degrees, because the urge to create shadows goes away. However, such a smooth yet micro detailed surface is not what we ordinarily think of when we say "arbitrary surface", and a floor printer intended for use on an "arbitrary surface" that is more likely micro textured works best if equipped to provide a grazing angle of incident illumination.

In one embodiment, an image of the illuminated region 104 is projected through an optical window 109 in package portion 108a of an integrated circuit and onto an array 110 of photo detectors. In particular, for each location sensor, IR light reflected from the micro textured surface is focused onto the photo detectors. This is done with the aid of lens 107. The package portion 108a might also dispense with separate window 109 and lens 107 by combining them into one and the same element. In one embodiment, the photo detectors are a square array of, say, 148 detectors on a side, each detector being a photo transistor whose photo sensitive region is 45 by 45 microns and of 60 microns center to center spacing. The photo transistors charge capacitors whose voltages are subsequently digitized and stored in a memory. The array 110 is fabricated onto a portion of an integrated circuit die 112 affixed by an adhesive 111 onto package portion 108b. In one embodiment, there is a printed circuit board. In one embodiment, the general level of illumination of region 104 is controlled by noticing the output levels of the photo detectors and adjusting the intensity of light issuing from the LED 102. This is either continuous control or pulse width modulation, or some combination of both. The number of photo detectors in the array and a frame rate at which their contents are digitized and captured cooperate to influence how fast the floor printer moves over the work surface and is still tracked.

In one embodiment, using the location sensors 21, 22, tracking is accomplished by comparing a newly captured sample frame with a previously captured reference frame to ascertain the amount of movement, and direction of movement, in two planar dimensions. Processing elements operate on a particular pixel and its nearest neighbors to produce an array of correlation values at each pixel location. The correlation values are based upon comparisons between a current image of the surface structure and a stored image representing a known position of inherent structural features, wherein the stored image serves as a position reference.

Figure 10:
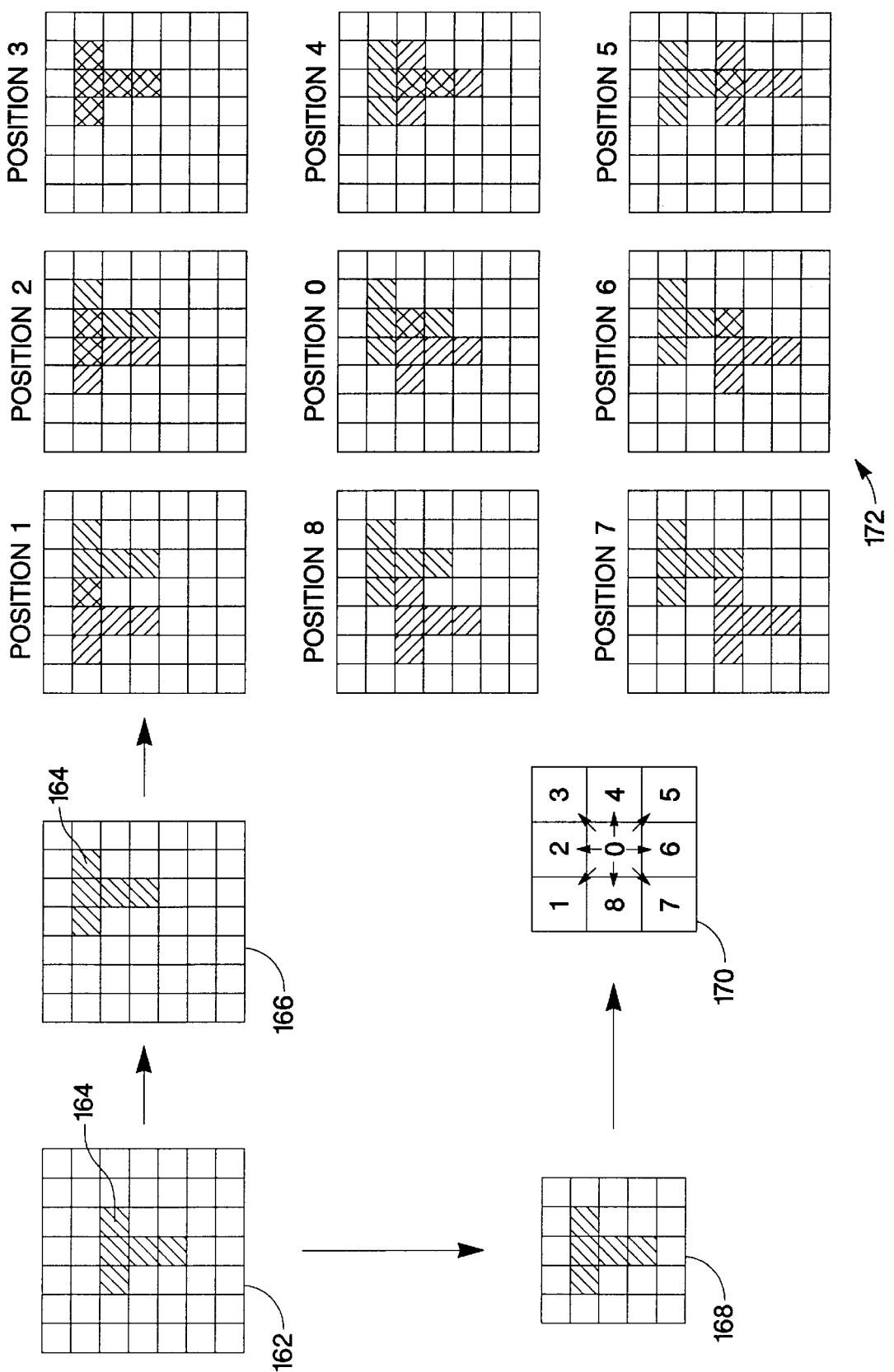
FIG. 10 is a conceptual representation of generating navigation information using location sensors of the floor printer.

As shown in the embodiment of FIG. 10, one way to track (and obtain correlation values) is to shift the entire content of one of the frames by a distance of one pixel (corresponds to a photo detector), successively in each of the eight directions 170 enabled by a one pixel offset trial shift (one over, one over and one down, one down, one up, one up and one over, one over in the other direction, etc.). There is also a ninth trial "null shift". After each trial shift those portions of the frames that overlap each other are subtracted on a pixel by pixel basis, and the resulting differences are (in one embodiment, squared and then) summed to form a measure of similarity (correlation) within that region of overlap. Larger trial shifts are possible, of course (e.g., two over and one down), but at some point the attendant complexity ruins the advantage. Simply having a sufficiently high frame rate with small trial shifts is desired. The trial shift with the least difference (greatest correlation) is taken as an indication of the motion between the two frames. That is, trial shift provides raw movement information which, in one embodiment, is scaled and or accumulated to provide display pointer movement information of a convenient granularity and at a suitable rate of information exchange.

As shown in FIG. 10, a transparent (reference) film 162 of clear and dark patterns arranged as if it were a checker board, except that the arrangement is perhaps random. A second (sample) film 166 having the same general pattern is overlaid upon the first, except that it is the negative image (dark and clear are interchanged). Now the pair is aligned and held up to the light. As the reference film is moved relative to the sample film the amount of light admitted through the combination varies according to the degree that the images coincide. The positioning that admits the least light is the best correlation. If the negative image pattern of the reference film is a square or two displaced from the image of the sample film, the positioning that admits the least light is one that matches that displacement. The displacement that admits the least light is noted; for the floor printer the positioning with the best correlation is noticed and the floor printer is moved that much. That, in effect, is what happens within an integrated circuit (IC) having photo detectors, memory and arithmetic circuits arranged to implement the image correlation and tracking technique described above.

It is desirable that a given reference frame is capable of being re-used with successive sample frames. At the same time, in one embodiment each new collection of nine (or twenty-five) correlation values that originates from a new image at the photo detectors (a next sample frame) contains a satisfactory correlation. Several successive collections of comparison frames are obtained from the 48 by 48 reference frame. What enables this to be done is maintaining direction and displacement data for the most recent motion (which is equivalent to knowing velocity and time interval since the previous measurement). This enables "prediction" of how to shift the collection of pixels in the reference frame so that for the next sample frame a "nearest neighbor" is expected to correlate. This shifting to accommodate prediction throws away, or removes, some of the reference frame, reducing the size of the reference frame and degrading the statistical quality of the correlations. When an edge of the shifted and reduced reference frame begins to approach the center of what was the original reference frame it is time to take a new reference frame. This manner of operation is termed "prediction." The benefits of prediction are a speeding up of the tracking process by streamlining internal correlation procedure (avoiding the comparison of two arbitrarily related 48 by 48 arrays of data) and a reduction of the percentage of time devoted to acquiring reference frames The array size, depending upon the type of medium, may vary. In one embodiment, the array size ranges from about 4 by 4 to about 200 by 200.

Another approach to acquiring position and orientation information is to provide an accelerometer. An on-board inertial navigation platform is used, with accelerations being sensed and integrated either once to obtain velocities or twice to obtain positions. In another embodiment, velocities of spring-suspended masses are sensed and integrated once in order to obtain positions. In one embodiment, gyroscopes are employed in a direct sensing of orientation.

Yet another alternative approach is to use any of a variety of mechanical linkages with which to track position and orientation relative to reference coordinates fixed with respect to the medium being scanned. In one embodiment, position and orientation information is obtained by means of sensors coupled to measure the relative movement of the mechanical members. In one embodiment, these sensors are of either the relative or absolute type and based on direct position and orientation sensing, or the sensing of accelerations or velocities that are then be integrated with respect to time, once or twice, to obtain positions. In one embodiment, non-contacting remote sensing are also be used to measure position and orientation of the scanning device relative to reference coordinates fixed with respect to the scanned original. Examples of such non-contacting sensing include those that use electromagnetic fields (see the embodiment described with respect to FIGS. 11 and 12), waves or beams (e.g. at optical or radio frequencies); electric effects (e.g. capacitive); and/or magnetic effects (e.g. inductive). In one embodiment, these approaches utilize standard or differential Global Positioning technologies and potentially use satellites. In one embodiment, these approaches also include traditional navigation/surveying methods, such as triangulations. In one embodiment, they also include techniques employed in robotics technologies, such as using shaped light beams and interpreting position from images of where these beams intercept the moving object.

Figure 11:
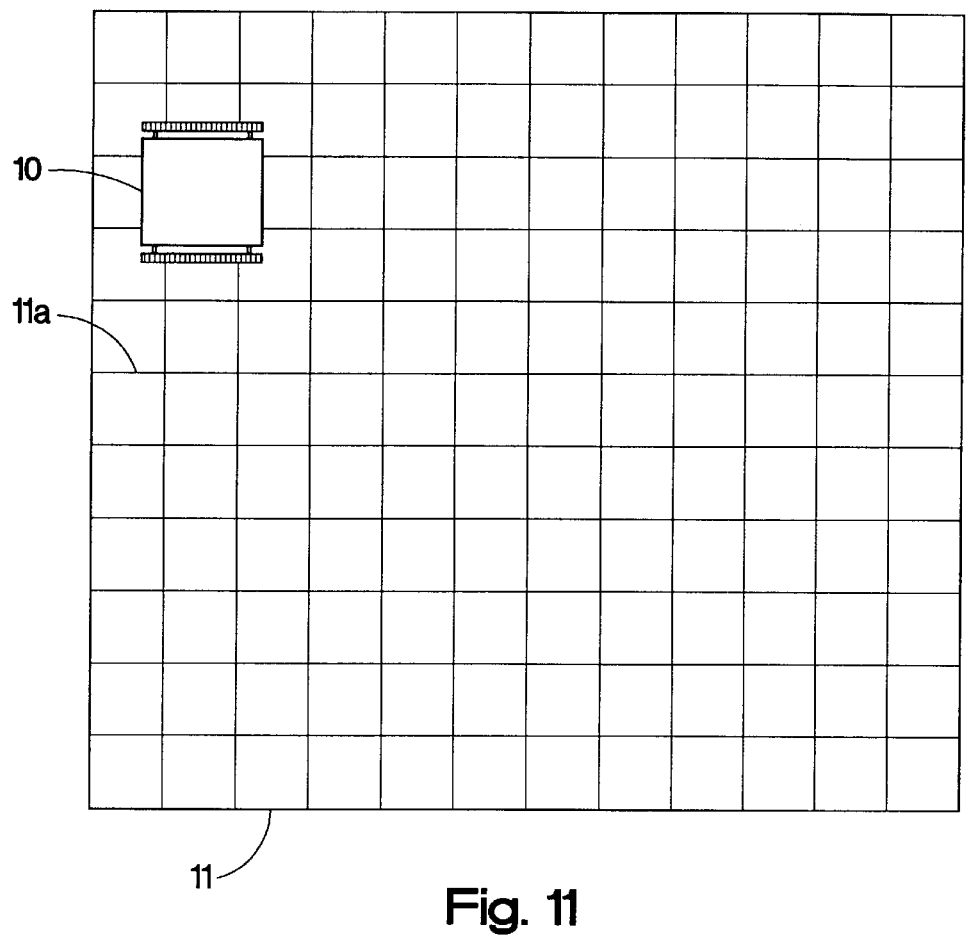
FIG. 11 is a top view of an embodiment of the floor printer of FIG. 11 on a grid of a medium.
Figure 12:
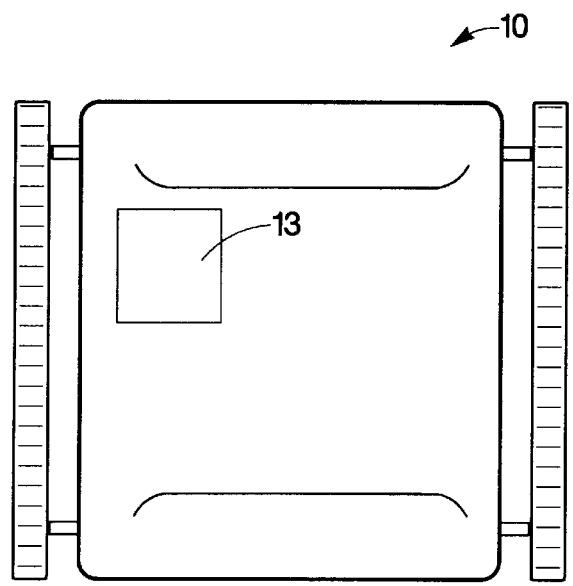
FIG. 12 is a schematic bottom view of another embodiment of the floor printer of FIG. 11.

In an embodiment shown in FIGS. 11 and 12, the floor printer 10 uses magnets to track the location of the floor printer. The medium 11 has a magnetic grid 11a. The floor printer has a magnetic sensor 13 that detects a change in magnetism when passing over one of the grid marks of the grid 11a. Based upon data associated with the grid mark that is detected by the magnetic sensor 13, the sensor 13 transmits data signals to the printing processor so that the position of the floor printer is determined. In one embodiment, each magnetic strip 11a has data indicative of its position in the grid. In another embodiment, the grid 11a is made of ultra-violet strips. The sensor 13 shines an ultra-violet light on the strips to determine the position of the floor printer. In one embodiment, the sensor 13 is larger than areas in between adjacent parallel grid lines. In this way, the sensor 13 is always in contact with at least one of the grid lines 11a. In one embodiment, a distance between adjacent grid lines ranges from about ⅛ inch to ½ inch. In one embodiment, the magnetic sensor 13 is a magnetic switch that is activated upon passing over one of the magnetized gridlines 11a.

In another embodiment, the locating sensors 21, 22 of the locating device 20 are a ground tracking radar system used to obtain a true ground speed measurement of the floor printer. The radar system has two radar transmitter and receiver units (T/R units not shown) that are aimed toward the printing surface and positioned at orthogonal angles to each other. A signal from one of the T/R units is sent to and reflected from the printing surface. The signal is received by the other of the T/R units. In one embodiment, the distance from the ground (the medium) to the units is determined empirically. Using the known distance, and the time determined in between sending and receiving the sent signal, the speed is determined. In another embodiment, the topography of the medium is continuously monitored to track the position and speed of the floor printer.

In embodiments using the carriage 56, an auxiliary optical encoder (not shown) is used to control carriage movement relative to the printer speed and location. The encoder is parallel to the slide rod and adjacent the carriage. The encoder has a plurality of substantially parallel lines. The number of lines on the encoder is calibrated to linear movement through program electronics. A sensor is positioned on the carriage to at least one of read and count the number of lines that the carriage is passing as the carriage moves along the slide rod. The sensor on the carriage transmits this information via a signal to the printing processor. In this way, the printing processor determines the position of the carriage.

In one embodiment, the user is prompted to select the boundary of the medium. In one embodiment, the starting point or coordinate point (0,0) is defined by the user. If the floor printer 10 is programmed, as a default, to begin printing the upper left corner of the image, the starting position is where the user desires the upper left corner of the image to be printed. In another embodiment, there is a starting location for the printing image other than in the upper left corner. In one embodiment, the user positions the printer at the starting point. In one embodiment, a fiducial marking is made on the medium by the user at the starting point. In another embodiment, the user defines two opposite edges of the medium onto which the image is to be printed, thereby defining a rectangular print area. In one embodiment, the two opposite edges are inked by the print head or fiducial nozzles using a pattern that is an easily recognizable by the locating device 20. The floor printer 10 is then able to print. However, if the floor printer has been lifted away from the medium 11, the user is prompted to place the floor printer at a location where the locating device 20 is able to locate the relative position of the printer as described in more detail below. In one embodiment, the printer is located over the starting point. In another embodiment, the printer is located adjacent the fiducial marking.

In one embodiment, the floor printer has a "hold" function that suspends the production of movement signals to the computer, enabling the floor printer to be picked up from and physically relocated on the floor or work surface without disturbing the relative position of the printer. This is used, for example, when the printer runs out of room on the floor, such as running into a wall. During this pick up maneuver, the motion indicating signals is kept from undergoing spurious behavior. In one embodiment, the "hold" function is performed automatically by a proximity sensor on the underside of the floor printer that determines that the floor printer is not in contact with the work surface, or by noticing that all or a majority of the pixels in the image have, to put simply, "gone dark." In one embodiment, the printer stops printing when the fiducial marking is no longer sensed by the sensors 21, 22. Even when the printer is moved off course from the fiducial markings, the printer stops printing until the fiducial marking is sensed again. In another embodiment, the floor printer suspends depositing printing material when the printer is picked up.

When the floor printer 10 is moved along the medium during the printing process, the sensors 21, 22 determine the relative movement of the floor printer 10 with respect to the medium. Depending on the new position of the floor printer 10, the printing processor 15 sends corresponding print data to the printing device 50.

Scanning Device

The scanning device 40 as illustrated in FIG. 3a is used to determine an image on the medium. In one embodiment, the image is the image printed by the printing device 50. The floor printer 10 is configured to periodically update the computer system 12 by transmitting data signals concerning the printed areas (received from sensors of the scanning device 40) versus the areas yet to be printed (data of the image file 84). For example, when movement of the floor printer 10 is occurring faster than the printing device 50 operates optimally there is a difference in image data. In one embodiment, the feedback unit 82 communicates the comparison data to the user and/or the printing processor 15.

In one embodiment, this comparison data is used by the computer system 12 to highlight the portion of the printed image in the displayed image on the monitor display, enabling the user to determine the progress of the printing process. This information is also utilized by the floor printer 10 to minimize the chances of having the floor printer 10 reprint over a previously printed area. In this manner, the whole image is printed when the floor printer 10 has covered the entire area of the paper in which the image is to be printed.

In one embodiment, the scanning device 40 has at least one image sensor. In one embodiment, the scanning device 40 uses a contact image sensor or CIS (for example, TSL218 from Texas Instruments of Dallas, Tex.). Contact imaging is obtained using interleaved array elements of sources and proximal sensors, without any imaging lenses. In one embodiment, the imaging sensors are part of a unit that also includes an illumination source, illumination optics, and image transfer optics, similar to the embodiment discussed above with regard to the locating device 20 described in FIGS. 9 and 10. In another embodiment, the scanning device 40 uses sensors employing projection optics, with magnification less than unity. In another embodiment, the scanning device 40 uses charge coupled devices (CCD's).

The scanning device assumes motion in one direction and scanning in a direction perpendicular to that motion. This is often enforced mechanically, for instance, by the translational mechanism positioned to move the floor printer perpendicularly to the image sensor of the scanning device.

In one embodiment, the scanning device 40 is operational during the print mode. In another embodiment, the scanning device 40 operates independently from the print mode.

Although this invention has been described in certain specific embodiments, many additional modifications and variations will be apparent to those skilled in the art. It is therefore to be understood that this invention may be practiced otherwise than as specifically described. Thus, the present embodiments of the invention should be considered in all respects as illustrative and not restrictive, the scope of the invention to be indicated by the appended claims rather than the foregoing description.

What is claimed is:

1. A floor printer comprising:

a means for printing an image on a medium;

a means for determining a position of the floor printer; and a nozzle on a bottom of the floor printer, wherein the nozzle deposits a layer over the printed image; and wherein the means for determining the position of the floor printer includes a magnetic sensor for detecting magnetic gridlines on the medium.

2. A floor printer comprising:

a means for printing an image on a medium;

a means for determining a position of the floor printer; and a nozzle on a bottom of the floor printer, wherein the nozzle deposits a layer over the printed image; and wherein the means for determining the position of the floor printer includes a fiducial nozzle on the bottom of the floor printer, and also includes a sensor having a filtered light that shines on a marking made by the fiducial nozzle, the filtered light corresponding to a color of the marking, wherein the means for determining the position of the floor printer further includes a means for producing, receiving and reading reflectance data based upon the light shone on the marking.

3. A floor printer comprising:

a means for printing an image on a medium;

a means for determining a position of the floor printer; and a nozzle on a bottom of the floor printer, wherein the nozzle deposits a layer over the printed image; and wherein the means for determining the position of the floor printer includes a ground tracking radar system.

4. The floor printer of claim 2 wherein the marking includes a line substantially paralleling a print swath of the floor printer.

5. The floor printer of claim 2 wherein there are three fiducial nozzles in a first corner, and another three fiducial nozzles in a second corner, wherein the three fiducial nozzles are substantially aligned with a directional movement of the printer.

6. The floor printer of claim 5 wherein each of the three fiducial nozzles includes two edges fiducial nozzles, and a middle fiducial nozzle that deposits a different fluid than the edge fiducial nozzles.

7. The floor printer of claim 6 wherein the edge fiducial nozzle nearest a front edge of the printer deposits a first fluid, and the middle fiducial nozzle deposits a second fluid over the first fluid.

8. The floor printer of claim 7 wherein the first fluid has a greater reflectance rate than the second fluid, the floor printer further comprising a locating device that is responsive to reflectance of fluids on the medium.

9. The floor printer of claim 2 further comprising a translational mechanism that enables the floor printer to automatically move to print on an adjacent print swath.

10. The floor printer of claim 2 wherein the means for printing includes a carriage containing print cartridges that moves along a slide rod in a direction perpendicular to a translational direction of the printer.

11. The floor printer of claim 2 further comprising a heater on the bottom of the floor printer to dry the image deposited by the printing device.

12. The floor printer of claim 2 further comprising a heater to dry the deposited layer.

13. The floor printer of claim 1 wherein the means for printing includes a printhead along the bottom of the floor printer.

14. The floor printer of claim 1 wherein the means for printing includes a carriage holding print cartridges along the bottom of the floor printer.

15. The floor printer of claim 1 further comprising a heater on the bottom of the floor printer to dry the image deposited by the printing device.

16. The floor printer of claim 1 further comprising a heater to dry the deposited layer.

17. The floor printer of claim 1 wherein the means for printing includes a carriage containing print cartridges that moves along a slide rod in a direction perpendicular to a translational direction of the printer.

18. The floor printer of claim 1 further comprising a translational mechanism that enables the floor printer to automatically move to print on an adjacent print swath.

19. The floor printer of claim 3 further comprising a heater on the bottom of the floor printer to dry the image deposited by the printing device.

20. The floor printer of claim 3 further comprising a heater to dry the deposited layer.

21. The floor printer of claim 3 wherein the means for printing includes a printhead along the bottom of the floor printer.

22. The floor printer of claim 3 wherein the means for printing includes a carriage holding print cartridges along the bottom of the floor printer.

23. The floor printer of claim 3 wherein the means for printing includes a carriage containing print cartridges that moves along a slide rod in a direction perpendicular to a translational direction of the printer.

24. The floor printer of claim 3 further comprising a translational mechanism that enables the floor printer to automatically move to print on an adjacent print swath.

* * * * *